United States Patent [19]

Strowik et al.

[11] Patent Number: 4,568,053
[45] Date of Patent: Feb. 4, 1986

[54] ARRANGEMENT FOR HEIGHT ADJUSTMENT OF SEATS, PARTICULARLY POWER VEHICLE SEATS

[75] Inventors: Willibald Strowik; Peter Thiel, both of Remscheid; Bernd Klüting, Radevormwald; Wilhelm Wingensiefen, Odenthal; Adolf Reinmöller, Remscheid; Jürgen Walz, Korntal-Münchingen, all of Fed. Rep. of Germany

[73] Assignee: Keiper Racaro GmbH & Co., Remscheid-Hasten, Fed. Rep. of Germany

[21] Appl. No.: 510,396

[22] Filed: Jun. 30, 1983

[30] Foreign Application Priority Data

Jul. 8, 1982 [DE] Fed. Rep. of Germany ....... 3225546

[51] Int. Cl.⁴ .................... A47C 1/023; B60N 1/02
[52] U.S. Cl. .................... 248/396; 297/328; 297/330
[58] Field of Search .......... 248/395, 394, 396, 397; 297/328, 330

[56] References Cited

U.S. PATENT DOCUMENTS

| | | | |
|---|---|---|---|
| 1,957,785 | 5/1934 | Knapp | 248/394 |
| 2,298,351 | 10/1942 | DeRose | 248/394 |
| 2,594,882 | 4/1952 | DeRose | 248/394 |
| 3,910,543 | 10/1975 | Fourrey et al. | 248/396 |

FOREIGN PATENT DOCUMENTS 453734 9/1936 United Kingdom ............... 297/329

Primary Examiner—Ramon S. Britts
Assistant Examiner—Karen Chotkowski
Attorney, Agent, or Firm—Michael J. Striker

[57] ABSTRACT

An arrangement for adjustment of seats has a seat support which is connected with rails associated with a vehicle bottom. The front end region of each lateral support member is connected via a swinging member with the associated rail in a pivotable manner. Each swinging member has a toothed rack in which a pinion supported in each lateral support member engages, and the pinion is arranged on a shaft extending through the lateral support members. An actuatable locking device fixes the pinion in the toothed rack together with the seat support in selected positions in stepped manner. For lifting or lowering the front and the rear seat region independently of each other, or together with each other, the rear end region of each lateral support member is also supported on a shaft extending through the seat support and fixedly connected with a pinion associated with each lateral support member. Each pinion engages in a vertically extending toothed rack fixed on each rail, wherein the pinion arranged on the same shaft is fixable by a locking device in selective height positions of the seat support in stepped manner.

23 Claims, 31 Drawing Figures

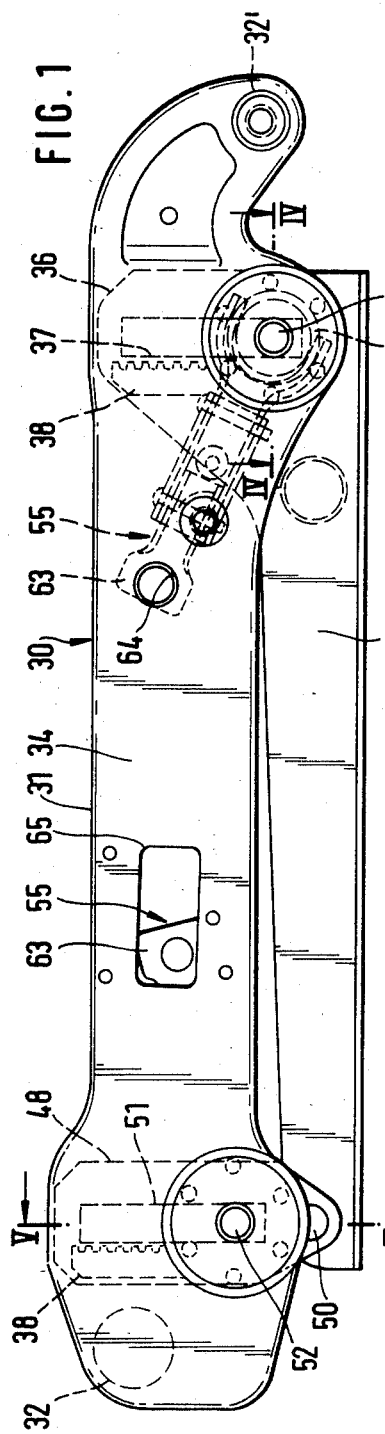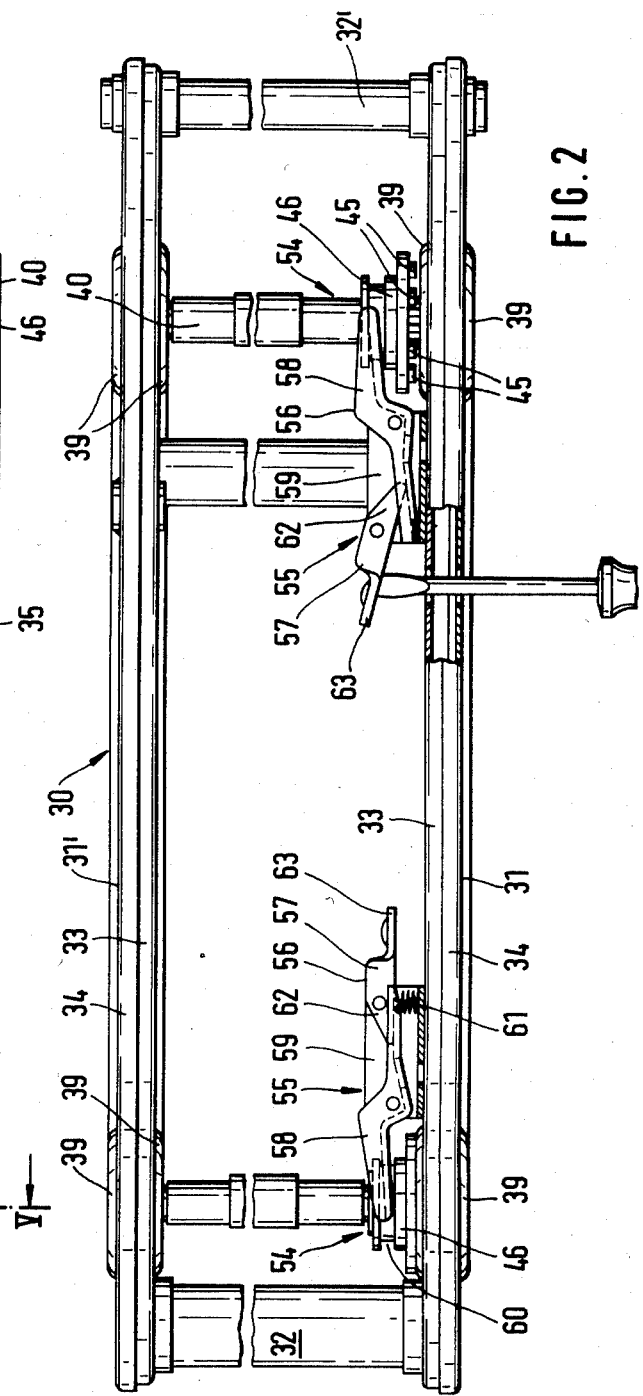

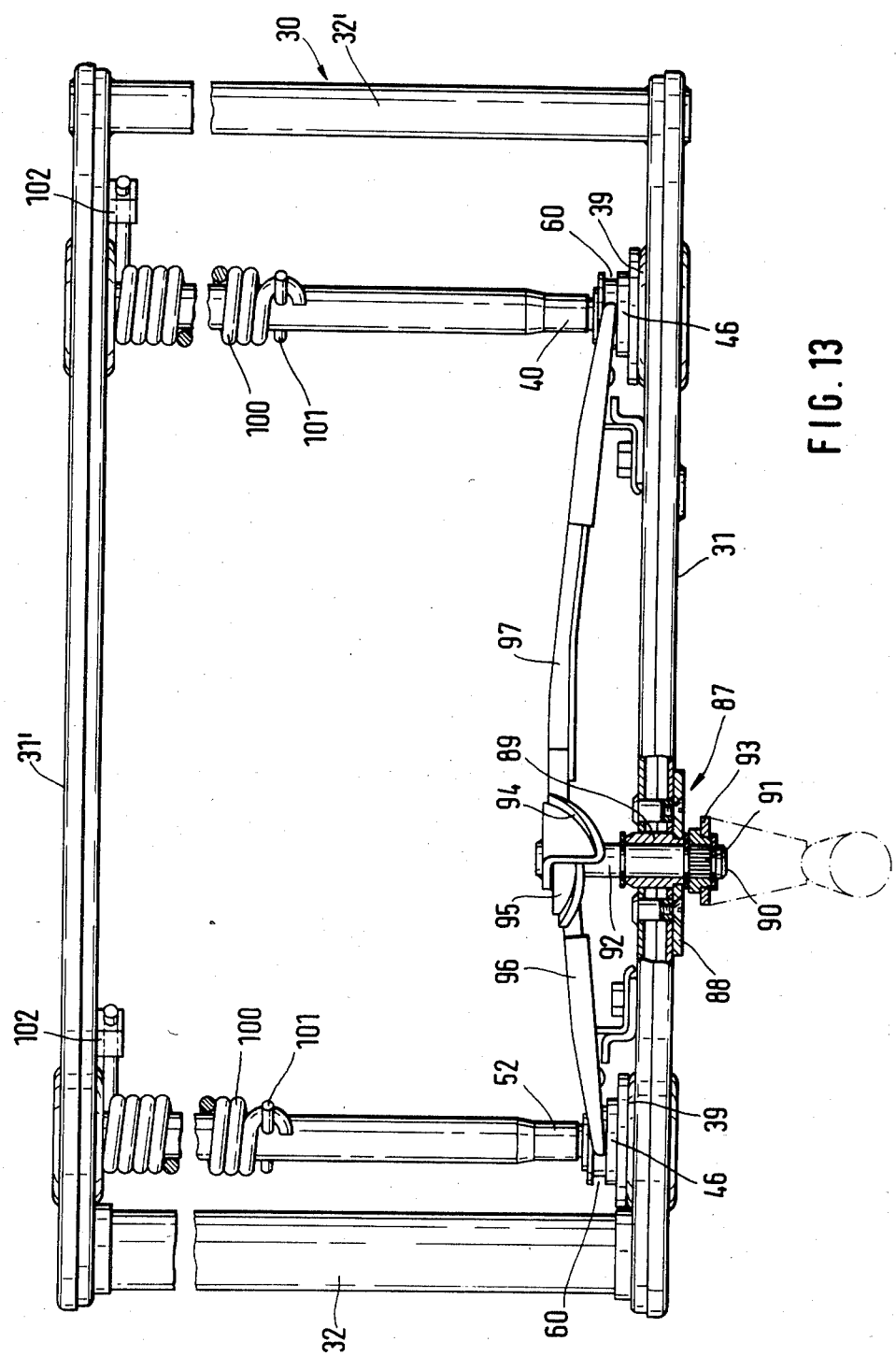

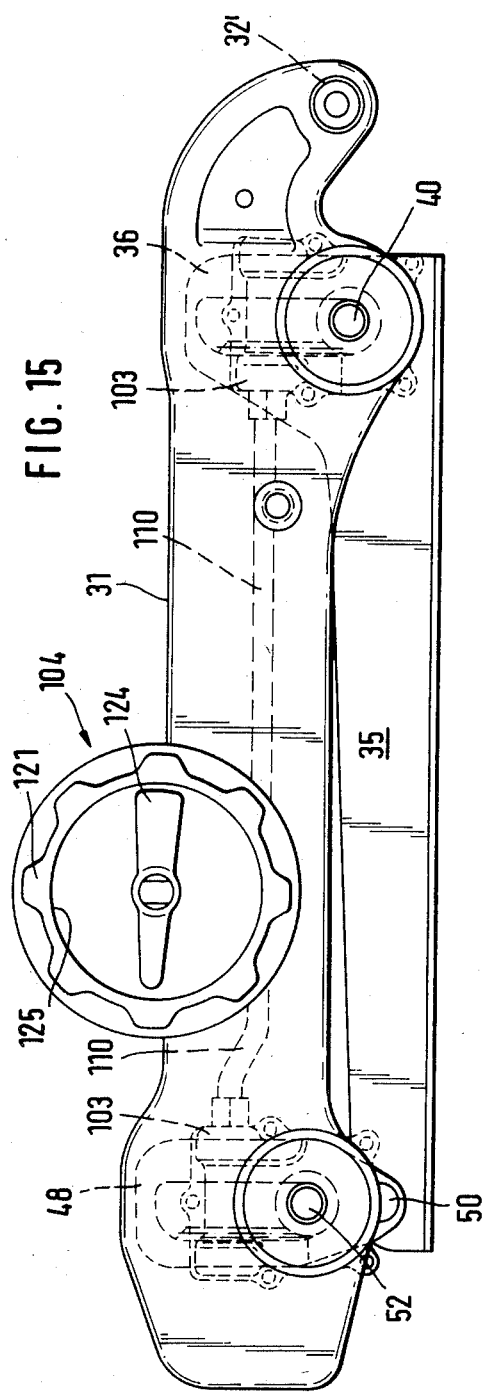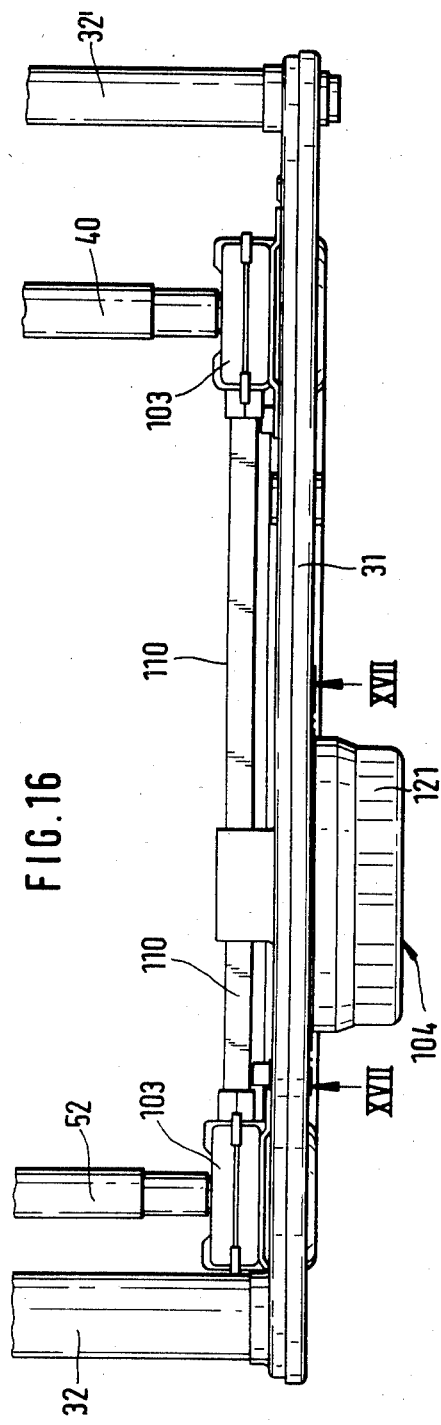

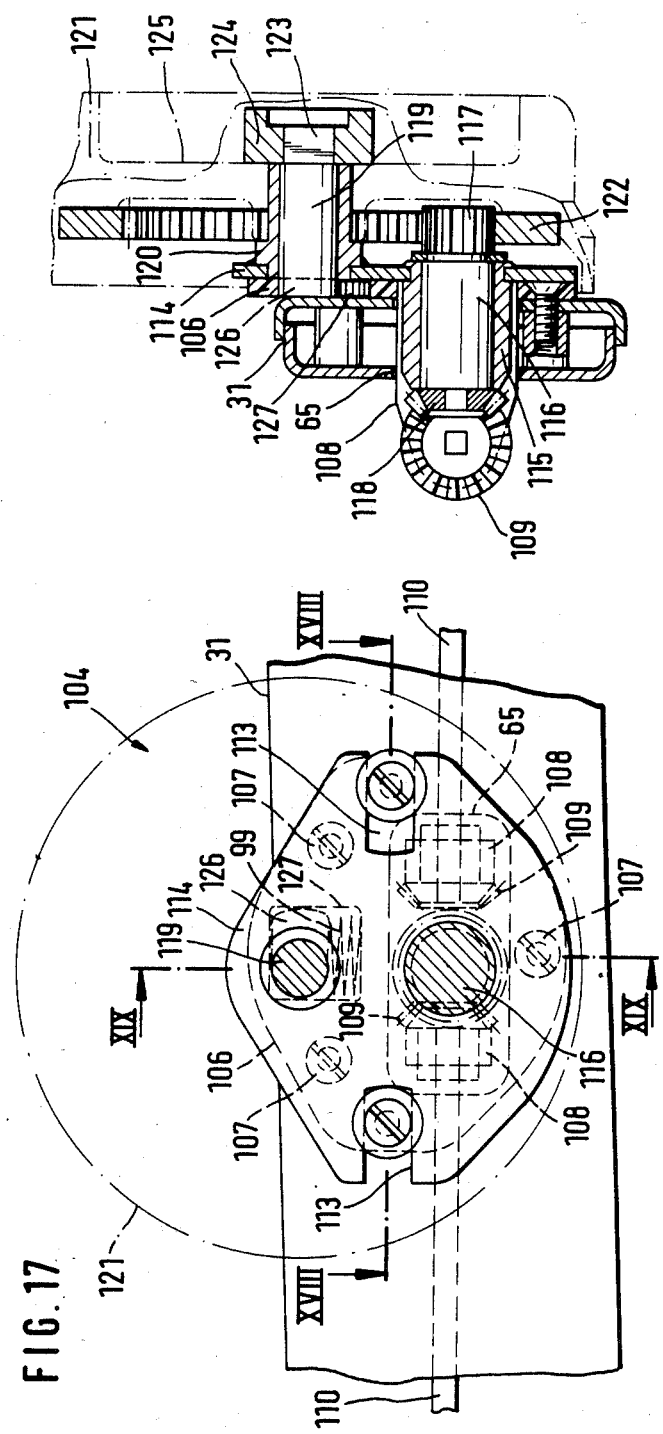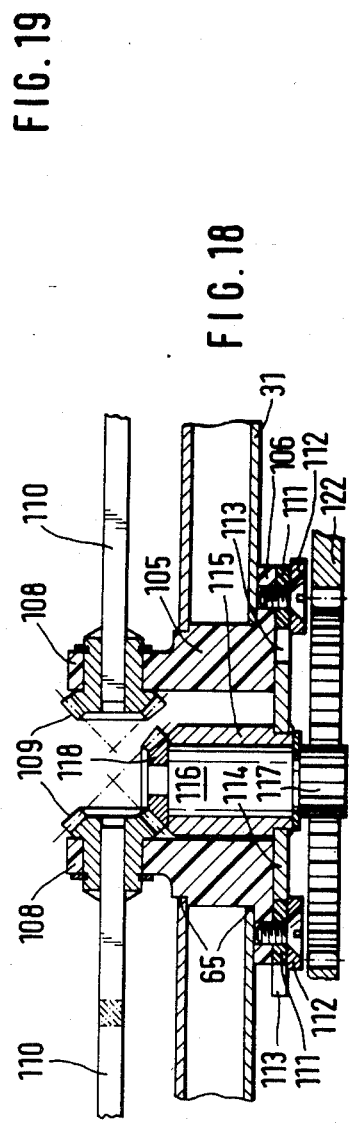

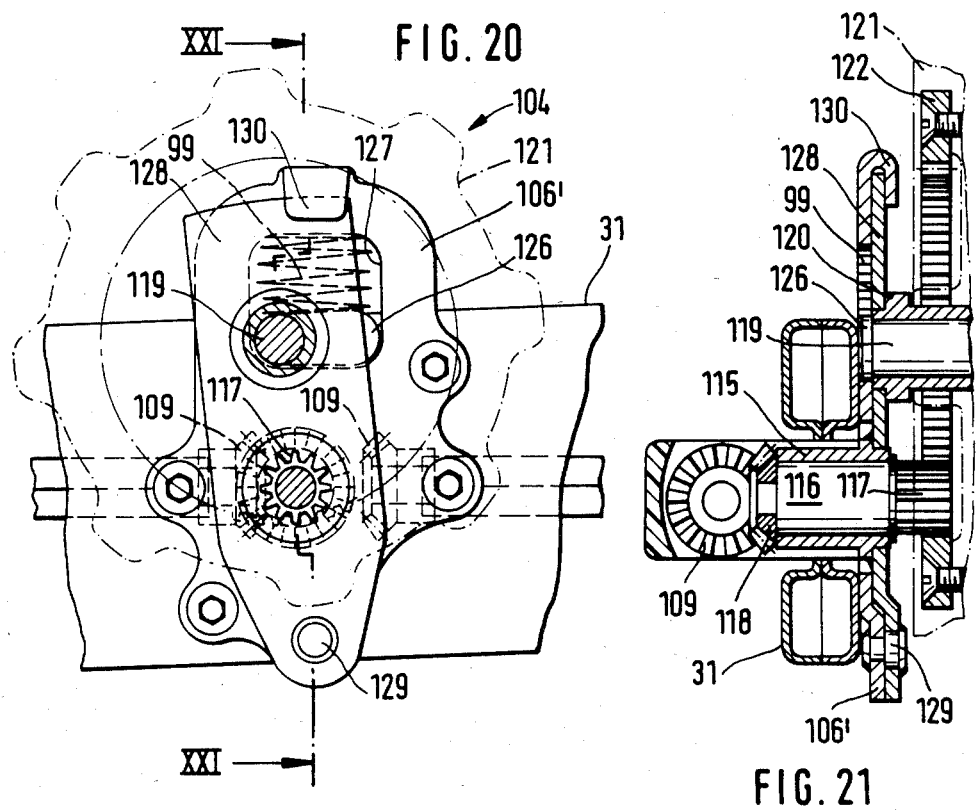
FIG. 20
FIG. 21
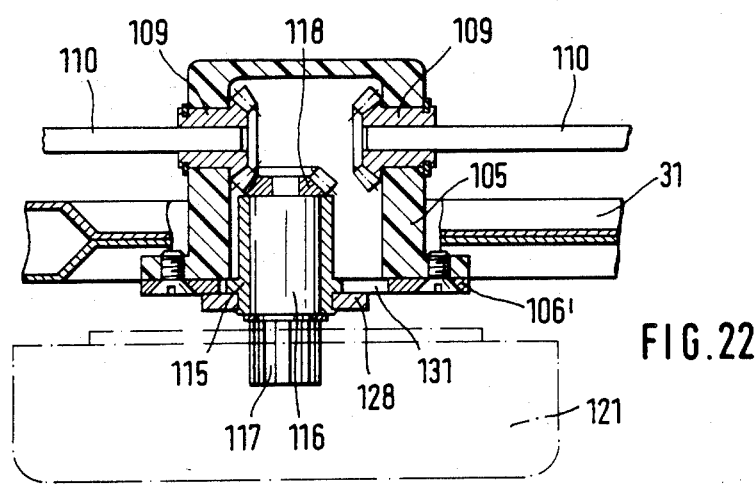
FIG. 22

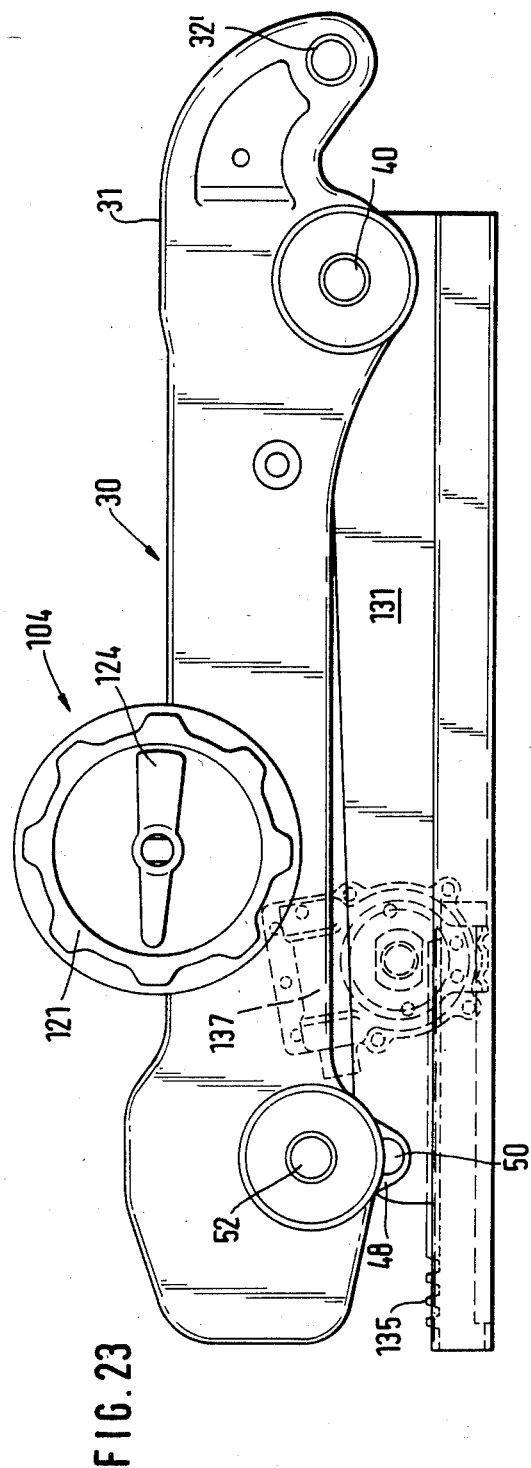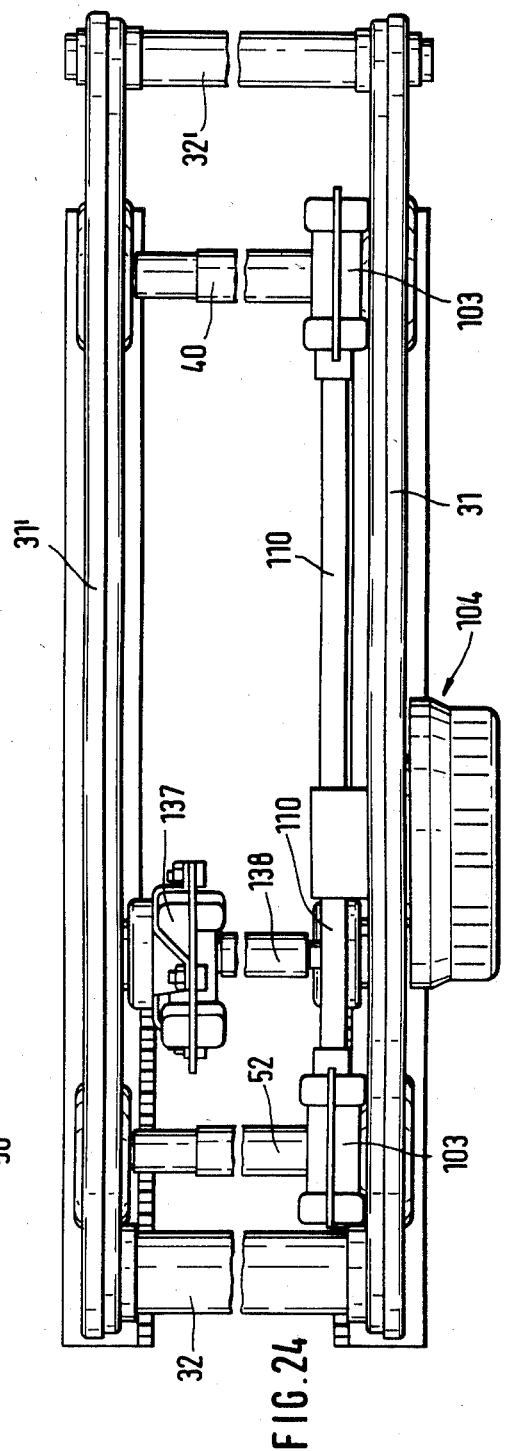

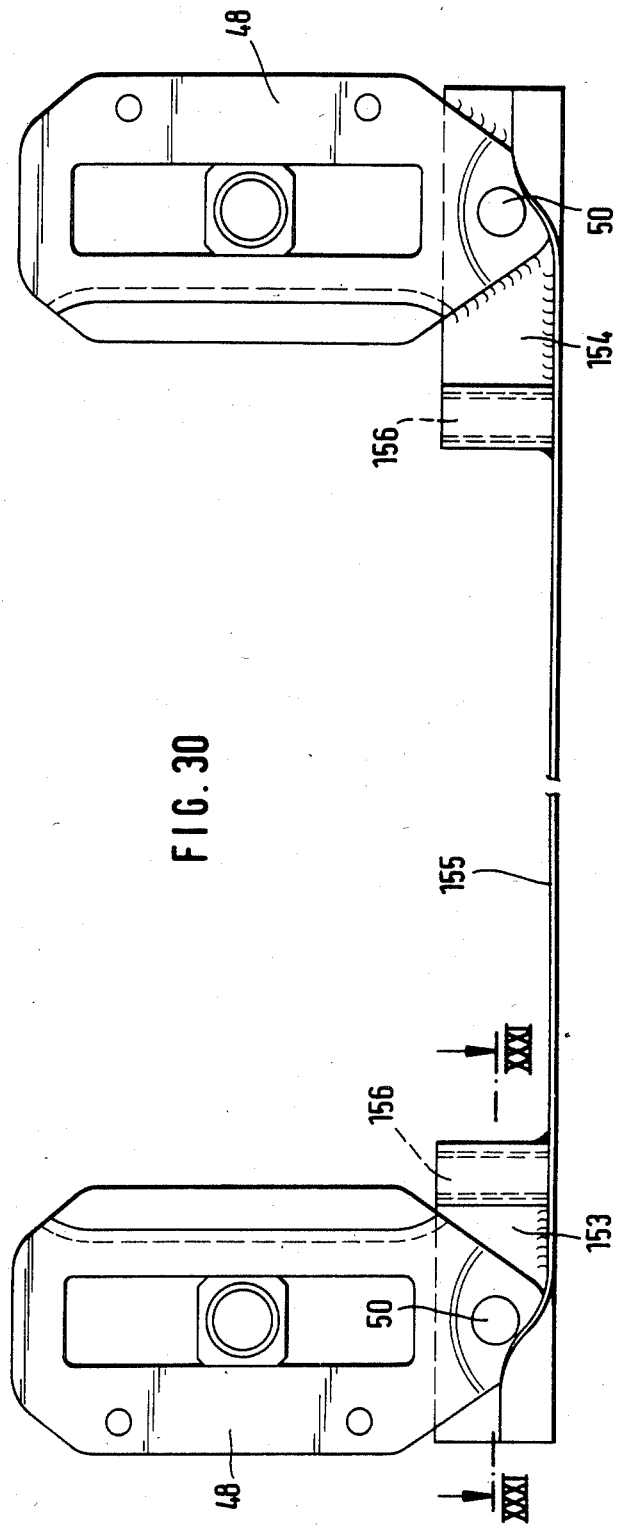

ARRANGEMENT FOR HEIGHT ADJUSTMENT OF SEATS, PARTICULARLY POWER VEHICLE SEATS

BACKGROUND OF THE INVENTION

The present invention relates to an arrangement for height adjustment of seats, particularly power vehicle seats.

Arrangements of the above mentioned general type are known in the art. In a known arrangement, a seat support is connected with rails associated with the vehicle bottom, wherein the front end region of each lateral supporting member is connected respectively via a swinging member with a toothed rack with the associated rail in pivotable manner, and a pinion is supported in each lateral support member and engages with the toothed rack. The pinions are arranged on a shaft extending through the lateral support members and fixable in stepped manner via an actuatable locking device together with the seat support in selectable height positions. One such arrangement is disclosed, for example, in the German Offenlegungsschrift 2,926,450. The seat support in this arrangement is supported in its rear region so that it can be turned about a horizontally extending axis relative to the rails associated with the vehicle bottom. In the front region a horizontally displaceable shaft extends through the seat support and has ends which are connected for joint rotation with the respective pinions. The pinions engage in the toothed racks of two swinging members supported on the rails, whereby a turning movement of the seat support relative to the rails is possible in a tension-free manner. For fixing the height position of the seat support, a locking device is retained in a shaft which is horizontally displaceable in the lateral support members. This locking device includes substantially locking pipes extending at both sides in the front seat region from the rails associated with the vehicle bottom. They have arcuately curved elongated openings which extend to the rear pivot point and have locking recesses extending towards the front side at different heights for receiving the shaft ends overlapping the pinion. For horizontal displacement of the shaft ends in the lateral support members, a lever system is provided which acts via an accumulator for automatically bringing a locking position of the shaft in the locking recesses. This locking position is released by a handwheel, whereby the seat support in its front region can be lifted or lowered. The swinging pipes at both sides are formed so that the toothed pinion is in constant engagement with the fixed toothed rack on each swinging pipe and a synchronous lifting movement at both lateral support members takes place. With this known arrangement, the front seat region can be lifted or lowered when desired, whereas the seat support and therefore the seat in its rear region substantially remains in its height position. In many cases, however, it is desirable to provide a possibility to adjust the seat in its height position universally to the requirements of the user. For this purpose a height adjustment of the rear seat region is also required.

SUMMARY OF THE INVENTION

Accordingly, it is an object of the present invention to provide an arrangement for height adjustment of seats of the above mentioned general type, which avoids the disadvantages of the prior art.

More particularly, it is an object of the present invention to provide an arrangement for height adjustment of seats in which it is possible to lift or lower the front seat region relative to the rear seat region, on the one hand, or also to lift or lower the rear seat region relative to the front seat region, and on the other hand, if necessary, to lower or lift the entire seat support relative to the vehicle bottom in a simple manner.

In keeping with these objects and with others which will become apparent hereinafter, one feature of the present invention resides, briefly stated, in an arrangement for height adjustment in which the rear end region of each lateral supporting member is also supported on a shaft extending through the seat support and fixedly connected for joint rotation with a pinion associated with each lateral support member, wherein each pinion engages in a vertically extending toothed rack fixed on each rail and the pinion is fixable in stepped manner by a locking device in selective height positions of the seat support.

When the height adjustment arrangement is designed in accordance with the present invention, it permits a height adjustment of the front seat region independent of the rear seat region, and also the rear seat region independent of the front seat region in their height position. For fixing the seat support relative to the rails arranged on the vehicle bottom in its adjusted position in a simple manner, the locking device is formed as a claw disk which is axially displaceable at one side on each shaft but is non-rotatable, so that in the event of locking it engages with its claws in recesses of the lateral support member and returns to its releasing position by an adjusting device.

For actuating the locking device, an adjusting device associated with the locking device includes in the simplest case a lever mechanism which is self-returnable to the locking position and engages the claw disk and also fixed at the inner side of the lateral support member.

Instead of the utilization of a lever mechanism for actuating the locking device, the adjusting device in accordance with the further embodiment of the invention can include an adjusting sleeve which can be coupled with the claw disk and is axially displaceable on the shaft, and also has an adjusting cog actuated against the force of a return spring.

A different locking device which is easily accessible for adjusting can include a shaft end which is fixedly connected with a claw disk, is axially displaceably supported on a longitudinal side of the lateral supporting member, and is self-returnable in the locking direction. This shaft end can be pressed back from the outer side together with the fixedly arranged thereon claw disk and adjusts for example by a screwdriver.

For providing such an adjustment in a simple manner without auxiliary means, the locking device in accordance with a further embodiment of the invention includes a holding disk which is arranged at one side on each shaft and has locking disks at its periphery, so that a holding member arranged on the lateral support member engages lockingly therein.

The holding disk connected for joint rotation with the pinion shaft can have between its locking teeth segment-like recesses in which, in the event of locking, the cylinder head of a holding member can engage, the holding member being formed as an axially displaceable pin supported in the lateral support member and self-transferrable to its locking position.

In accordance with another embodiment, the holding member can be formed as a locking lever provided with a toothed segment and supported on the lateral support member so as to self-return to its locking position.

The above described adjusting device is associated separately with each individual adjusting shaft, so that the locking device arranged on the shaft in the front seat region and the locking device arranged on the shaft in the rear seat region can be actuated separately and individually. It is in many cases advantageous to provide the adjustment of both the rear seat region and the front seat region from a central point. To satisfy these requirements, a further embodiment of the present invention provides that a lever mechanism of the locking device arranged in the front end region of the lateral support member and a further lever mechanism of the locking device arranged in the rear end region of the same lateral support member are actuated by a common adjusting lever pivotally supported on the lateral support member, selectively for transferring the claw disk to its releasing position. For this purpose the adjusting lever has, advantageously, curved sectors arranged inclined on its pivot axle in the axial direction, so that each locking device can be brought into engagement with the end of each lever.

With the above described solutions, the adjustment of the seat height position is possible only when the seat user leaves the seat after release of the locking device so as to turn or lift the same to the desired position. After reaching the desired height position, it can be arrested in such a manner that the seat user releases the locking device so that the return means of the locking member is brought to arresting engagement. For providing the situation in which the seat user during the adjusting movement of the seat support can remain on the seat, a further embodiment of the present invention is that both the shaft of the front and rear locking device are surrounded by a torsion helical spring which compensates the seat weight and the normal weight of a seat user and arranged so that its one end is fixed on the shaft and the other end is fixed on the lateral support member.

Instead of the above described locking device formed as claw disks, holding disks, etc., the locking device in accordance with a further embodiment of the invention can be formed as a worm drive arranged on each shaft so that its worm gear is connected for joint rotation with the shaft which carries a pinion engaging in the toothed rack, whereas the worm forms the driving member for the pinion arranged at both ends of a shaft. The utilization of the worm drive is advantageous since such worm drives are self-locking and require no special braking devices.

It is advantageous when the worm drive associated with each shaft is fixed at one side of the seat support on the same lateral support member on which a central adjusting screw is connected with both worm drives is arranged, so that the worm drives can be driven selectively as desired.

In accordance with a further embodiment of the invention, the central adjusting screw has a bearing body fixed on the lateral support member and having two spaced bearing ears projecting at the inner side of the lateral support member, wherein mutually facing bevel gears are supported in the bearing ears and arranged so that each is in rotary connection with the worm gear. The bearing body is held by a horizontally movable bearing plate which in turn holds a further bevel gear supported coaxially with a screw pinion for joint rotation therewith, on the one hand, and a bearing projection for receiving a key pin which moves the bearing plate is arranged, on the other hand. The key pin is engaged by a handwheel which has an inner toothed rim engageable with the screw pinion and is supported with its outer side before an adjusting grip connected for joint rotation with the key pin.

Advantageously, the bearing plate together with the pinion shaft which has the bevel gear, with the handwheel, and with the bearing projection which receives the key pin are held horizontally displaceable on the bearing body connected with the lateral support member.

Instead of the utilization of a horizontally displaceable bearing plate, it is also possible in accordance with another embodiment of the invention to form the bearing plate which holds the pinion shaft having the bevel gear, the key pin, and the bearing projection receiving the handwheel, as a swinging lever.

In addition to the possibility to adjust the seat support in its height position, it is also advantageous for adjusting to the dimensions of the seat user and for providing sufficient access to the vehicle back, to arrange the rails which hold the seat support advantageously longitudinally displaceable in a guide rail fixed to the vehicle bottom and to arrange at least on one longitudinal side of the seat at the inner side of the guide rail a toothed rack which engages with a pinion supported on the longitudinally displaceable rail and driven by a motor via a worm drive.

For eliminating clamping because asymmetrical force is applied for the displacing movement, it is advantageous when the toothed racks are arranged at both longitudinal sides of the seat on the guide rails and the pinions connected with each toothed rack are connected with one another via a transmission shaft.

For providing a motor-driven adjustment of the seat support, both in its longitudinal direction and its height, and at the same time to provide that the adjusting movements for the longitudinal direction and also for the front height region and the rear height region be performed independently of one another, a further embodiment of the present invention provides that both the worm drive for the height adjustment of the seat and also the worm drive for the longitudinal adjustment of the seat are associated with a separate adjusting motor, and each adjusting motor is connected via a flexible shaft with the associated worm drive.

For providing an economical motor-driven adjustment of the seat support movements, a further embodiment of the invention provides an arrangement in which the worm drive for the height adjustment of the seat and the worm drive for the longitudinal adjustment of the seat are connected in torque-transmitting manner with a central drive motor.

Advantageously, the central drive motor is connected with a distributing transmission which has one input and two outputs, wherein its one output is connected with the worm drive for the longitudinal adjustment of the seat, and its other output is connected with a further distributing transmission, which also has one input and two outputs and arranged so that its one output is connected with the worm drive for the front height adjustment of the seat and its other output is connected with the worm drive for the rear height adjustment of the seat.

For providing independent arrangement of the drive motors and the distributing transmission with the worm transmission, it is advantageous when the distributing transmission with the worm drive for the longitudinal adjustment of the seat and the further distributing transmission and the worm drives for height adjustment of the seat are connected via flexible shafts.

For providing a compact structural unit which protects the adjusting structural parts, the lateral shells surround the rails or the bearing consoles with the swinging members located thereon at least sectionally and in a sandwich-like manner.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a lateral view showing a seat support connected with rails associated with the vehicle bottom, wherein the seat support is in a completely lowered position;

FIG. 2 is a plan view of the seat support of FIG. 1, in whose rear region a claw disk for height adjustment of a rear seat region is coupled;

FIG. 11 is a side view of a further embodiment of a seat support connected with rails associated with the vehicle body, with a central adjusting device;

FIG. 13 is a plan view of the seat support shown in FIG. 12;

FIG. 15 is a side view of a further embodiment of a seat support connected with rails associated with the vehicle bottom, wherein a worm drive is used as the locking device and is actuated via a centrally arranged adjusting device;

FIG. 16 is a plan view showing the lateral support member having the central adjusting device and the worm drive;

FIG. 17 is a view showing the central manual adjusting device in a vertical section taken along the line 17—17 in FIG. 16;

FIG. 18 is a view showing the central manual adjusting device of FIG. 17 in a horizontal section taken along the line 18—18 in FIG. 17;

FIG. 19 is a view showing the central manual adjusting device in a vertical section taken along the line 19—19 in FIG. 17;

FIG. 20 is a view showing a further embodiment of a central manual adjusting device with a swinging member which is pivotable by a key pin and operates for selective tooth engagement of the bevel gear, in a front view with removed handwheel and an adjusting grip incorporated therein;

FIG. 21 is the adjusting device shown in FIG. 20 in a longitudinal section taken along the line 21—21 in FIG. 20;

FIG. 22 is a view showing a manually actuatable adjusting screw in a horizontal section taken along the line 22—22 in FIG. 20;

FIG. 23 is a view showing a further embodiment of a seat support connected with bottom-side rails with a central manually actuated adjusting device and a seat support with a longitudinally displaceable rail arrangement;

FIG. 24 is a plan view of the longitudinally displaceable seat support of FIG. 23;

FIG. 30 is a view showing a further embodiment in which instead of a rail which supports the seat support, two bearing consoles at each longitudinal side of the seat are arranged and connected with one another by a mounting band for forming a support web, on the other hand, and for rotatably supporting a swinging member, on the other hand, on an enlarged scale as compared with the preceding Figures; and FIG. 31 is a plan view of the bearing console which supports the swinging member of FIG. 30.

DESCRIPTION OF THE PREFERRED EMBODIMENTS

Figure 3:
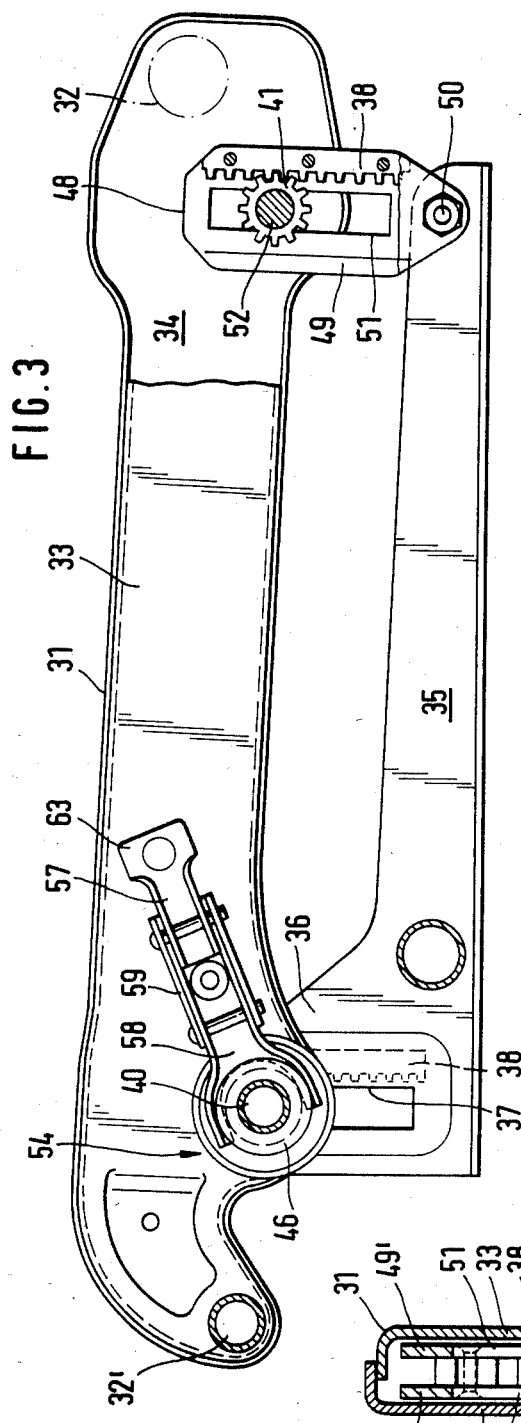
FIG. 3 is a partially sectioned front view of the seat support of FIGS. 1 and 2 from the inner side, wherein the seat support is located in a lifted position relative to its rail associated with the vehicle bottom.

A vehicle seat which is not shown composed of a backrest part and a seat part can be mounted on a seat support 30. The seat support 30 is composed of two lateral support members 31 and 31' assembled in a sandwich-like manner and two transverse support members 32 and 32' which connect the former with one another. Each lateral support member is composed in the shown embodiments of two lateral shells 33 and 34. Each lateral shell has a C-shaped cross section, and the lateral shells face towards one another with their open sides, whereas the outer lateral shell 34 overlaps the inner lateral shell in an edge region and is welded with the same.

Rails 35 associated with the vehicle bottom are located under the lateral support members 31 and 31'. Each rail 35 is composed of two angle pieces which are joined with one another to form a unit with a T-shaped cross section. Each rail 35 has the rear side region with an upwardly extending support web 36 provided with an elongated opening 37 which extends in a vertical direction. The support web 36 of the rail 35 is extended in the region of this elongated opening, so that a free space is formed between both web parts. A toothed rack 38 is arranged in this free space and fixedly connected with the support web 36, for example by welding.

The support web 36 of each rail 35 extends into the inner space of each lateral support member 31 and 31' in the rear seat region, and it is to be understood that the lower side of the seat support is open in this region. Each lateral support member 31 and 31' has in the region of the support web 36 extending into its inner space, bearing ears 39 provided in their lateral shells 33 and 34. The ends of a shaft 40 are supported in the bearing ears 39 and are each provided with a pinion 41 fixedly connected with the respective end for joint rotation with the shaft. Each pinion extends into the free space of the support web 36 and engages with the toothed rack 38 mounted therein. The shaft ends connected at both sides of the shaft with the pinions are surrounded by bearing bushes 42 which are supported in the bearing ears 39 of the lateral support members 31 and 31', on the one hand, and guided in the longitudinal opening 37 of the respective support web 36 of the rails 35 in vertical direction, on the other hand. For reducing wear, the guiding region in the longitudinal opening 37 of each supporting web can be coated with a shaped cover.

Spacer rings 43 are arranged between the outer side of the support web 36 and the inner side of the lateral shells 33 and 34 of each lateral support member 31 and 31' in the bearing ears 29, and particularly in their region close to the shaft. With the aid of the spacer rings 43 the lateral support members 31 and 31' are held centrally and with a sufficient play avoiding friction relative to the rails 35. The inner lateral shells 33 of each lateral support member is provided in the region of its pressed-out bearing ear with a plurality of openings 44 arranged on a partial circle at equal distances. The same number of pin-shaped claws 45 of a claw disk 46 can engage in the openings 44. This claw disk 46 is axially displaceable on an inner shaped portion 47 of the shaft 40, but is supported non-rotatable on the shaft 40.

A rocking member 48 engages in the front seat region into each lateral support member 31 and 31' and is composed of two shackles 49 and 49' arranged at a distance from one another and pivotally supported at both sides of the central web of the rail 35 in the front seat region on a bearing pin 50 extending through the web of the rail 35. An elongated opening 51 corresponding to the elongated opening 37 of the support web 36 is provided in each shackle 49 and 49'. The toothed rack 38 is mounted between the shackles 49 and 49'. The ends of a shaft 52 extend through each rocking member 48 and are fixedly connected for joint rotation with the pinion 41 which respectively engages with the toothed rack 38 of the locking member 48. The shaft has at both sides of the pinion 41 bearing portions which are supported via the bearing bushes 42 in the front bearing ears 39 of the lateral support members 31 and 31'. The bearing bushes 42 similarly engage in the longitudinal opening 51 of the rocking member 48.

The spacer rings 43 are arranged between the outer sides of the rocking member 48 and the inner side of the bearing ear 39 in the region of the end of the shaft 52, so as to maintain the longitudinal central arrangement of the rocking members 48 and the respective lateral support members 31 and 31'. The bearing ears 39 of the inner lateral shells 33 of the lateral support members 31 and 31' also have in the region of the locking member 48 a plurality of opening-like recesses 44 arranged on the same partial circle. The pin-shaped claws 45 of the claw disk 46 which are supported on shaped portions 53 of the shaft 52 inwardly of the shaft ends in non-rotatable but axially displaceable manner can engage into the recesses 44. In the embodiment shown in FIGS. 1-8, the claw disks 46 and 46' form in connection with the shafts 40 or 52 on which they are arranged axially displaceable a .locking device 54 which is arranged at only one longitudinal side of the seat, preferably the side facing toward the vehicle door, for example on the lateral support member 31.

Instead of the rails 35 which hold and support the seat support, it is also possible to use at each longitudinal side of the seat in front and rear seat regions bearing consoles 153 and 154 which are held in their position and at a distance relative to one another by a mounting band 155 which is not supporting and facilitates the mounting. Each bearing console 153 and 154 is composed of an upright flat bar which is fixedly connected with the ends of the mounting band and so folded that its folding loop forms a receiving opening for a mounting screw. The receiving opening can be formed as a throughgoing opening or as a threaded opening 156, and a screw can be screwed into this opening from below through a mounting rail or the vehicle bottom. The above described rocking member 48 is connected with the aid of the bearing pin 50 with each bearing console 153 and 154 and composed of the shackles 49 and 49', as described hereinabove. Whereas the rocking members 48 arranged for example in the front seat region can be turned, the rear rocking members 48 are welded with the bearing console 153 and perform the same functions as the support webs 36 of the rails 35. With the utilization of the bearing consoles a weight economy is obtained, on the one hand, and a reduction of the structural space is provided, on the other hand.

For operating the locking device 54 it is associated with a respective adjusting device 55. In the embodiment shown in FIGS. 1-3, the adjusting device is formed by a lever mechanism 56. This lever mechanism is composed of two two-side levers 57 and 58 which can be acted at opposite sides. The levers 57 and 58 are pivotally supported on a substantially U-shaped lever support 59 which is mounted at the inner side of the lateral support member 31. The adjusting arm of the lever 58 is fork-shaped and engages in an annular groove 60 of the claw disk 46. The power arm of the lever 58 is on the one hand loaded by a pressure spring located between the same and the lever support 59 at the lower side, whereas the adjusting arm of the lever 57 acts upon the outer side of the power arm of the lever 58. The pressure spring 61 is arranged substantially below the pivot point of the lever 57, so that it is retained in the locking position shown at the left side in FIG. 2. At least the lateral support member 31 has in the region of the power arm 63 of the lever 57 recesses 64 or 65. A screwdriver can extend through the recesses 64 or 65 as shown for example in FIG. 2 to turn the power arm 63 in direction of a lever movement for a releasing displacement of the claw disk 46, against the force of the pressure spring 61, as shown at the right side in FIG. 2.

Figure 4:
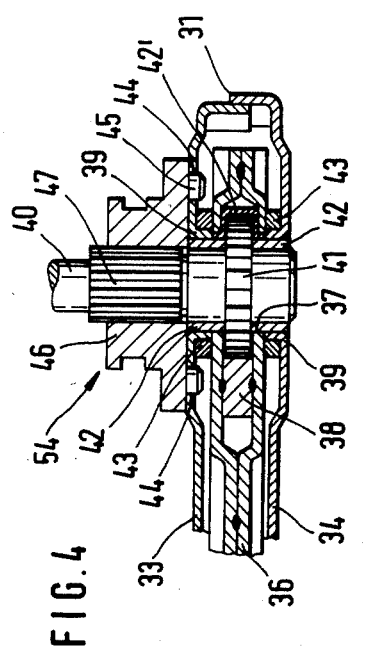
FIG. 4 is a view showing a one-sided support of the rear seat region on the rail associated with the vehicle bottom in a horizontal section taken along the line 4—4 in FIG. 1.
Figure 5:
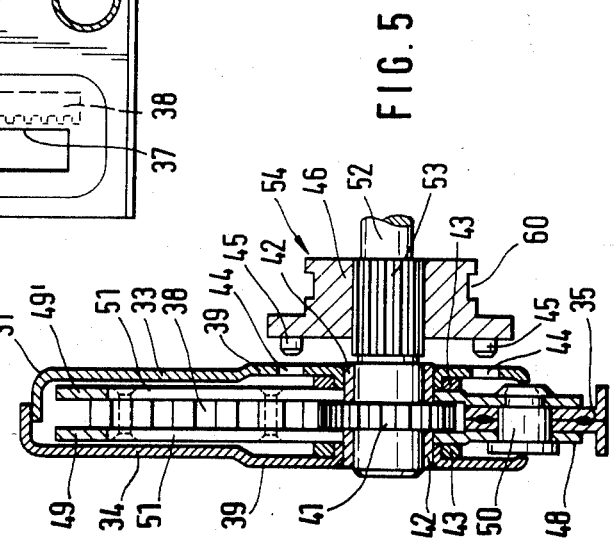
FIG. 5 is a view showing a front end support of the seat support on the rail associated with the vehicle bottom with interposition of a swinging member pivotally supported on the rail, in a longitudinal section taken along the line 5—5 in FIG. 1.

When the seat support 30 must be retained relative to the rail 35 in the adjusted height position, the claw disk is coupled from the position shown at the left side of FIG. 2 and in FIG. 4 with the lateral shell 33 of the lateral support member 31. The claws 45 of the claw disk 46 engage into the openings 44 of the bearing ear 39 of the lateral support member and prevent, because of the rotation-fixed connection of the claw disk 46 with the shaft, a rotary movement of the pinion 41 rotation-fixedly connected with the shaft relative to the toothed gear 38 fixedly arranged in the rocking member 48. Thereby the locking position shown at the left side of FIG. 3 is retained, so that the front region of the seat support 30 is supported via the bearing ears 39 on the shaft 52 which is retained non-rotatable in the case of locking. When however, as shown at the right side of FIG. 2, the claw disk 46 is displaced back to its releasing position, the claws 45 of the claw disk 46 are withdrawn from the openings 44 in the bearing ear 39 of the lateral shell 33 of the lateral support member 31. The claw disk 46 assumes the position on its shaped portion of the shaft as shown in FIG. 5. As can be easily recognized, the pinion 41 rolls on the toothed rack 38, when for example the seat support 30 is lifted or lowered relative to the rail 35. During transferring the lever mechanism 56 to the position shown at the right side of FIG. 2, the height of the seat support 30 relative to the rail 35 in the rear seat region can be adjusted by simultaneous lifting or lowering of the rear seat region. After attaining the desired height, the actuation of the lever 57 is finished, for example by the shown screwdriver, so that the claw disk 46 with its claws 48 is again pressed back, via the pressure spring 61 and the lever 58, into the openings 44 in the bearing ear 69 of the lateral support member 31. In this position, the above described locking is again produced, and the seat support is held in the adjusted position. It is to be understood that only one stepped locking position is obtained, in correspondence with the pitch distance of the claws 45 or the openings 44.

Figure 6:
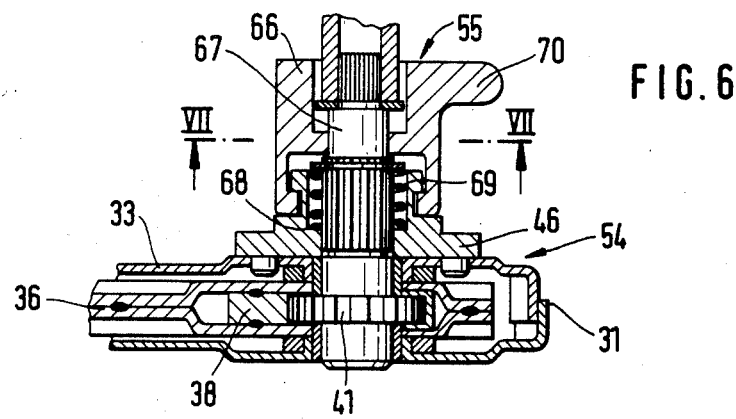
FIG. 6 is a view showing a further embodiment of a one-side support of the rear seat region on the rail associated with the vehicle bottom, also in a horizontal section analogous to FIG. 4, wherein an adjusting sleeve coupled on the shaft with the claw disk is axially displaceable.
Figure 7:
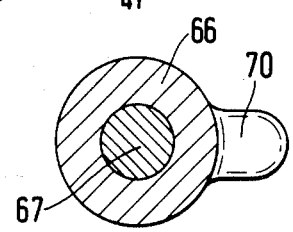
FIG. 7 is a view showing the adjusting sleeve of FIG. 6, in a section taken along the line 7—7 in FIG. 6.

In the embodiment shown in FIGS. 6 and 7, the locking device 54 corresponds to the locking device shown in FIGS. 1-3. The distinction is, however, in the adjusting device 55. The adjusting device 55 is composed substantially of an adjusting sleeve 66 which is coupled with the claw disk 46 and arranged axially displaceably on a shaft portion 67 located inwardly of the shaped portion 47. The claw disk 46 is provided sectionally with a recess 68 which receives a return spring 69. The return spring 69 abuts against a supporting ring which is fixed on the shaft portion 67. An adjusting cog 70 is arranged on the outer periphery of the adjusting sleeve 66 so that the adjusting sleeve and the claw disk 46 coupled therewith can be transferred with the aid of the adjusting cog 70 in a released position against the force of the return spring 69.

Figure 8:
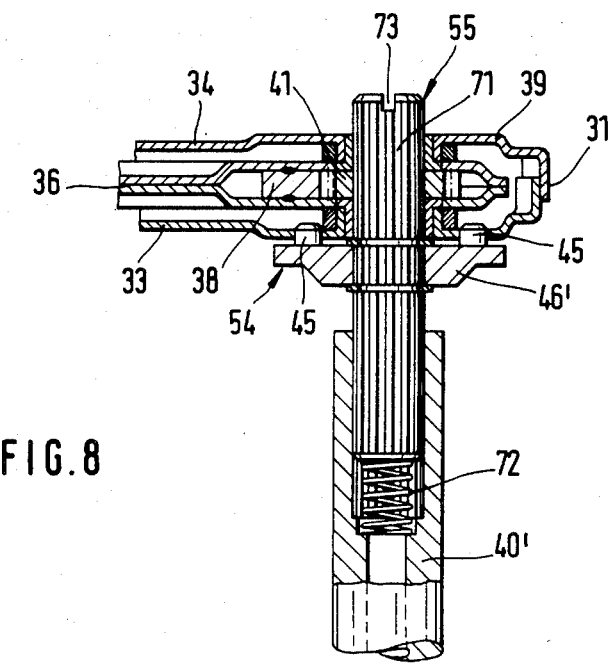
FIG. 8 is a view showing a further embodiment of a one-side support of the rear seat region on the rail associated with the vehicle bottom, wherein the shaft end is displaceable together with the claw disk in an axial direction.

In the embodiment shown in FIG. 8, the locking device 54 in connection with the adjusting device 55 is similarly provided with a claw disk 46'. This claw disk differs however from the above described embodiments in that it does not have an annular groove. Moreover, the claw disk 46' is fixed for joint rotation with, but axially displaceable on, a serrated shaft 71 which forms a shaft end axially displaceable relative to a shaft 40'. The serrated shaft 71 arranged at one side of the shaft 40' is axially displaceable in the shaft 40' against the returning action of an accumulator 72 in a torque-transmitting manner. The outer end of the serrated shaft 71 extends beyond the bearing ear 39 of the laterally shell 34 by at least the length of the pin-shaped claws 45 of the claw disk 46. A slot 73 is provided in the end face of the outwardly projecting end of the serrated shaft 71, for example for insertion of a screwdriver. Therefore the serrated shaft 71 can be pressed against the force of the accumulator toward the inner side of the seat support 30, so that the claws 45 are withdrawn from the openings 44 in the lateral support member 31 and permit a rotary movement of the shaft 40' together with the pinion 41 relative to the toothed rack 38 engaging with the same for height adjustment of the seat support 30 relative to the rail 35.

Figure 9:
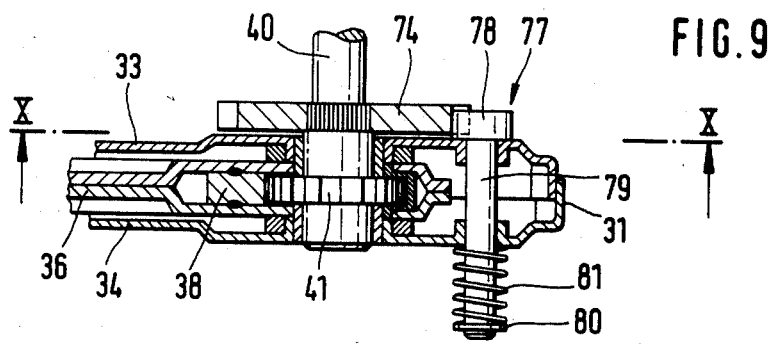
FIG. 9 is a view also showing an embodiment of a one-side support of the rear seat region on the rail associated with the vehicle bottom in a horizontal section, wherein a holding disk at an inner side is provided and formed so that a head of an axially displaceable pin supported in a lateral support member can lockingly engage in its periphery provided with locking keys.
Figure 10:
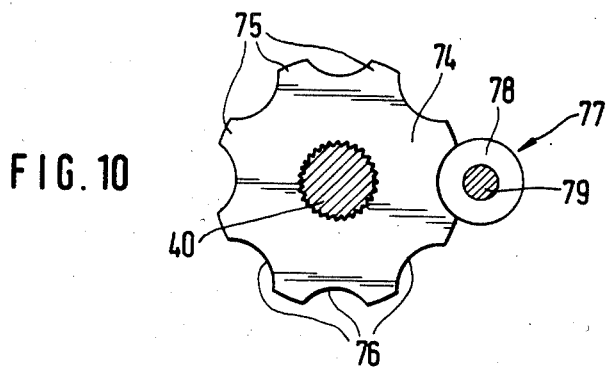
FIG. 10 is a view showing the locking device of FIG. 9 in a section taken along the line 10—10 in FIG. 9.

In the embodiment shown in FIGS. 9 and 10, the locking device is composed of a holding disk 74 which is fixed respectively on the shafts 40 and 52 at one side in non-rotatable and axially non-displaceable manner. Moreover, a pinion 41 is supported in non-rotatable and axially non-displaceable manner on the respective shaft in the region of each shaft end as in the above described embodiments. The pinion 41 is surrounded at both sides either by the extension of the support web 36 of the rail 35 or by the rocking member 48 rotatably connected with the rail 35 and fixedly connected with the toothed rack 38 in which the pinion 41 engages. The outer periphery of the holding disk 74 has locking teeth 75 spaced from one another by teeth gaps 76. A holding member 77 is arranged on the lateral support member 31 and can engage in the teeth gaps 76. In the embodiment shown in FIGS. 9 and 10, the teeth gaps 76 are formed as segment-like recesses arranged between the locking teeth so that a cylinder head 78 of a pin 79 which forms the holding member closingly engages in the latter.

The pin 79 which forms the holding member extends from the outer side of the lateral supporting member 31 from its lateral shell 34 outwardly with a shaft part. This outwardly extending shaft part is provided at its end with a support shoulder 80 for a return spring 81 which supports at the other end on the outer side of the lateral shell 34. Thereby the cylinder head 78 is pulled normally into the teeth gap 76 formed as a segment-like recess, whereby a rotation of the shaft and the non-rotatably connected pinion 41 relative to the tooth rack 38 is prevented. Thereby the adjusting position of the lateral support member 31 relative to the support web 36 of the rail or relative to the rocking member 48 connected with the rail 35 is secured.

Figure 11:
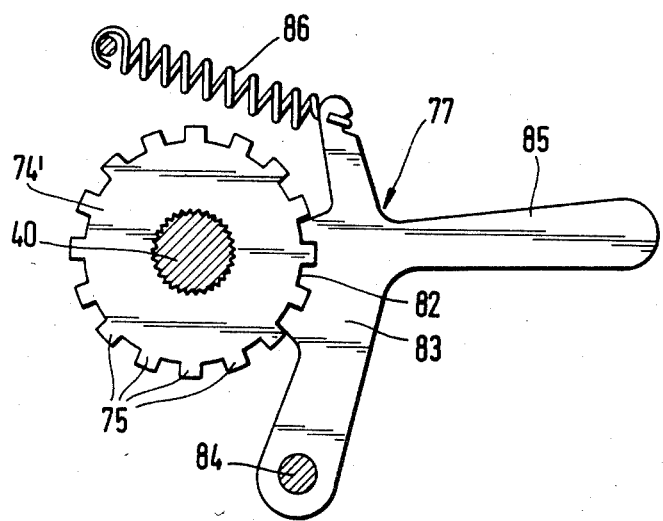
FIG. 11 is a view showing a further embodiment of a locking device in a front view taken along the section line 10—10 in FIG. 9.

In a locking device in accordance with the embodiment shown in FIG. 11, shaft 40 or the shaft 52 is fixedly connected for joint rotation with a holding disk 74' provided at its periphery with the locking teeth 75. The holding member 77 is formed as a locking lever 83 having a toothed segment 82 and supported via a rotary pin 84 on the not shown lateral support member 31. The locking lever 83 may be provided for facilitating the actuation with a handle 85, and is automatically returnable to its locking position for example via a pulling spring 86.

Figure 12:
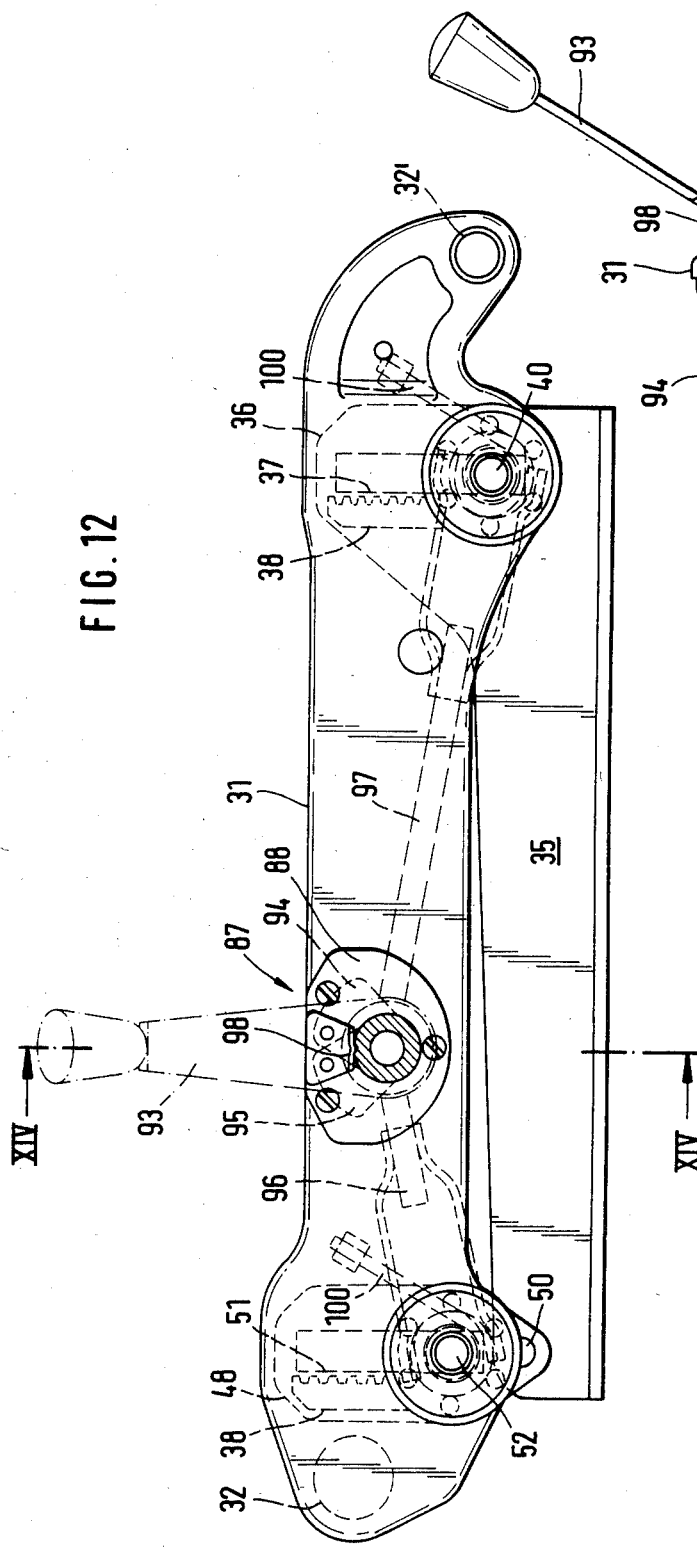
Figure 14:
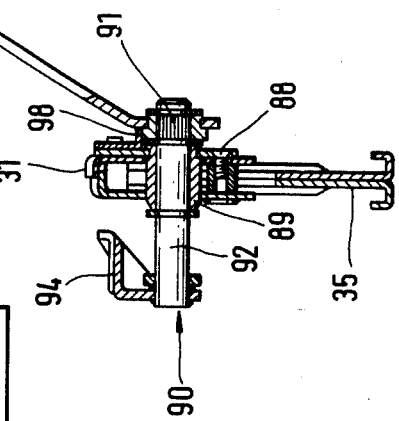
FIG. 14 is a view showing a longitudinal section of the central adjusting device, taken along the line 14—14 in FIG. 12.

In the above described embodiment, each shaft in the front and in the rear seat region is separately and individually actuated by the adjusting device associated with this shaft. In the embodiment shown in FIGS. 12–14 a central, manually actuatable adjusting device 87 is provided. This adjusting device includes a flange bearing 88 which extends through the lateral support 31 with a bearing bush 89 and is screwed on the lateral support. The bearing bush 89 receives a pivot pin 90 which has a pin region 91 extending at the outer side of the lateral support and a pin region 92 extending to the inner side of the seat support 30. An adjusting lever 93 is arranged on the outer pin region 91 for joint rotation therewith, whereas the pin region 92 extending to the inner side of the seat support is provided at its free end with curved sectors 94 and 95 which are arranged offset relative to one another and fixedly connected for joint rotation with the inner pin region 92, for example by welding. The inner pin region 92 of the pivot pin 90 received directly before the curved sectors 94 and 95, the ends of two levers 96 and 97 which are pivotally supported on the lateral support member 31 and engage via a fork shoe into the annular groove 60 of the claw disk 46.

The lever 96 serves for uncoupling of the claw disk 46 associated with the shaft 52, whereas the lever 97 serves for uncoupling the claw disk 46 associated with the shaft 40. The curved sector 94 connected with the pivot axle 90 acts upon the lever 97, whereas the curved sector 95 acts upon the lever 96. Thus, the curved sectors 94 and 95 are formed and arranged relative to one another so that in the event of turning of the adjusting lever 93 to the position shown in FIG. 12 in clockwise direction, the lever 97 alone is so turned that the claw disk 46 arranged on the shaft 40 is displaced via the forked shoe of the lever 97 in releasing direction. When, however, the adjusting lever 93 is turned to the position shown in FIG. 12 in counterclockwise direction, the curved sector 95 alone acts on the lever 96 so that the claw disk 46 associated with the shaft 52 is displaced in releasing direction. When, however, the adjusting lever is again returned to the zero position shown in FIG. 12, in which the adjusting lever is arrested by a spring angle 98 engageable with its projection into a groove of its hub, the return spring 69 presses also the claw disk 46 with its claws, as shown in FIG. 6, again into the recesses in the bearing ears 39 of the lateral support member 31 back in locking manner.

For providing a height adjustment of the seat support 30 also when the seat user remains on the seat, each shaft 40 or 52 is engaged by a weight-equalizing torsion helical spring 100. The torsion helical spring has at its end an ear which is fixed on a pin 101 extending through the respective shaft, whereas the other end of the torsion helical spring abuts against a projection 102 of the lateral support member 31'. The torsion helical spring 100 is so tensioned that, during releasing of the respective claw disk 46, the respective shaft rotates in such a rotary direction that the pinion 41 runs in the toothed rack 39 upwardly and thereby lifts the seat support region associated with the respective shaft. With the utilization of both side rocking members arranged at a seat end, a distance difference between the center of the shaft 40 and the bearing pin 50 of the locking member, produced because of the turning movement, is possible.

The above described locking devices are utilized for arresting the height position, the claw disks 46 or 46', or the holding disks 74 or 74'. A worm drive 103 shown in FIGS. 15 or 16 can also be used as the locking device so as to provide a self-locking and automatic maintenance of an assumed adjusted position after interruption of the drive. A not shown worm gear of each worm drive 103 is fixedly connected with the respective shaft 40 or 52. The end of each shaft also receives the pinion 41 shown in FIGS. 3–5 for joint rotation therewith, and this pinion also engages in the toothed rack 38 of the rocking member 48, on the one hand, and in the support web 36 of the rail 35, on the other hand. The not shown worm of each worm drive 103 forms a driving member for the pinion 41 which is also not shown in FIGS. 15 and 16. Each worm drive 103 associated with the respective shaft 40 or 52 is mounted on only one side of the seat support 30, for example on the lateral support member 31. A manually actuated adjusting screw 104 is provided between the shafts 40 and 52 on the lateral support members 31 in the embodiment of FIGS. 15 and 16.

The central adjusting screw shown in FIGS. 17–19 has first a bearing body 105 which abuts with its bearing plate 106 against the outer side of the lateral support member 31 and is fixedly connected with the same by screws 107.

At the side opposite to the bearing plate 106, two bearing ears 108 arranged at a distance from one another extend from the bearing body 105 and project relative to the inner side of the lateral support member 31. A bevel gear 109 is rotatably supported in the bearing ears 108, but is not displaceable in axial direction. Each of the bevel gears 109 is connected, for example via a flexible shaft 110, with the worm of the worm drive 103 in torque-transmitting manner. Guide pieces 111 are screwed in a horizontal distance from one another by pressing screws 112 on the bearing plate 106. The guide pieces 111 are overlapped by horizontally extending slots 113 of a bearing plate 114. A bearing sleeve 115 is fixedly connected with the bearing plate, for example by pressing-in, in the central plane coinciding with the center of the bevel gear. A shaft piece 115 is rotatably and axially immovably supported in the bearing sleeve 115. At the outer side of the lateral support member 31, the shaft piece 116 is connected with a screw pinion 117, for example of one piece with the same. At the other side, the shaft piece 116 is connected for joint rotation with a bevel gear 118 engaging between the bearing gears 108. This bevel gear 118 is dimensioned such that, during engagement in the bevel gear 109, it has a distance to the other opposite bevel.

The longitudinal displacement of the bearing plate 114 relative to the bearing body 105 permits displacement to the right of the bevel gear 118 from the engaging position shown in FIG. 18, so that the bevel gear 118 can come into engagement with the right bevel gear 109, whereas the engaging connection with the left bevel gear 109 is simultaneously released. The displacement of the bearing plate 114 is actuated by a key pin 119 supported in a bearing projection 120 which is fixedly connected for joint rotation with the bearing plate 114 and arranged at a distance from the bearing sleeve 115. A handwheel 121 shown in dash-dot lines in FIGS. 17 and 19 is supported on this bearing projection and has an inner toothed rim 122 engaging with the screw pinion 117. The key pin 119 has at its front end a cam portion 123. An adjusting grip 124 which is embedded in a circular recess 125 of the handwheel 121 and fixes the latter in axial direction is connected with the cam portion 123. A plate 126 is fixedly connected with the key pin 119, which engages in an adjusting window 127 of the bearing plate 106 fixedly connected with the lateral support member 31. The plate 126 is loaded by a return spring 99 arranged in the adjusting window 127, so that the plate moves after each adjusting step to its horizontal locking position.

The adjusting grip 124 rotates only by 180° between two end positions. Via the plate 126 arranged in the adjusting window 127 of the position-invariable bearing plate 106, the bearing plate 114 together with the bearing sleeve 115 and the bearing projection 120 is displaced horizontally with the aid of the slots 113 sliding on the guide pieces 111. The bevel gear 118 reaches the engaging position shown in FIG. 18, whereby the handwheel 121 is rotatably connected with the worm drive 103 associated with the shaft 52. With this positioning of the bearing plate 114 shown in FIG. 18, a transmission of this rotary movement via rotation of the handwheel 121 takes place via the inner tooth rim 122, the screw pinion 117 engaging therewith, and the bevel gear 118 rotatable about the same axis, to the left bevel gear 109 which is connected via the flexible shaft 110 with the worm drive associated with the shaft 52. Thereby the rotary movement of the handwheel in one or the other rotary direction is further transferred to the pinion 41, which engages with the toothed rack 38 of the rocking member 48, so that the seat support 30 can be lifted or lowered in the region of the shaft 52. For adjusting the seat support in its rear region associated with the shaft 40, the adjusting grip 124 is first rotated against the position shown in FIG. 15 by 180°, so that the bearing plate 114 and the structural parts rotatably supported thereon are displaced via the plate 126 turnable in the adjusting window 127. The bevel gear 118 comes into engagement with the bevel gear shown at the right side in FIG. 18, so that the rotation of the handwheel is transferred via the respective structural parts to the worm drive 103 associated with the shaft 40.

An adjusting screw shown in FIGS. 20-22 differs from the adjusting screw of FIGS. 17-19 in that it does not have a horizontally displaceable bearing plate but instead is provided with a swing lever 128. The bearing sleeve 115, on the one hand, and the bearing projection 120, on the other hand, are mounted on the swing lever, and the handwheel 121 having the inner tooth rim is rotatably supported on the bearing projection 120. Moreover, the key pin 119 is also supported in the bearing projection 120 and its plate 126 engages in the adjusting window 127 of a bearing plate 106' fixedly connectable with the lateral support member 31. The swing lever 128 is pivotally connected below the bearing sleeve 115 with the bearing plate 106 via a hinge pin 129. For axially securing the position of the swing lever 128 relative to the bearing plate 106, it has at its upper end a guide finger 130 overlapping the swing lever 128.

With the exception of the fact that the bearing plate 106 has the recess 131 for extension of the bearing sleeve 115 permitting the swinging movement, the design of the other structural parts of the adjusting drive 104 shown in FIGS. 20-22 essentially corresponds to the design of the respective structural parts of the adjusting drive of FIGS. 17-19.

When with the adjusting screw shown in FIGS. 20-22 the not shown there adjusting grip 124 is rotated by 180°, the plate 126 turns also via the key pin 119 in the adjusting window 127 of the bearing plate 106'. Thereby the swing lever 128 with the structural members located thereon is brought either to the position shown in FIGS. 19 and 22 or turned so that the bevel gear 118 comes into engagement with the bevel gear 109 at the right side of FIG. 22. Thereby the same adjusting condition takes place; therefore, either via the shaft 52 the pinion 41 connected therewith as shown in FIGS. 3-9 rolls in the toothed rack 38 of the swinging member 48 upwardly or downwardly, and thereby the front seat region is adjusted in its height, or via the pinion 41 arranged at both sides of the shaft 40 the height of the rear seat region is adjusted.

Figure 25:
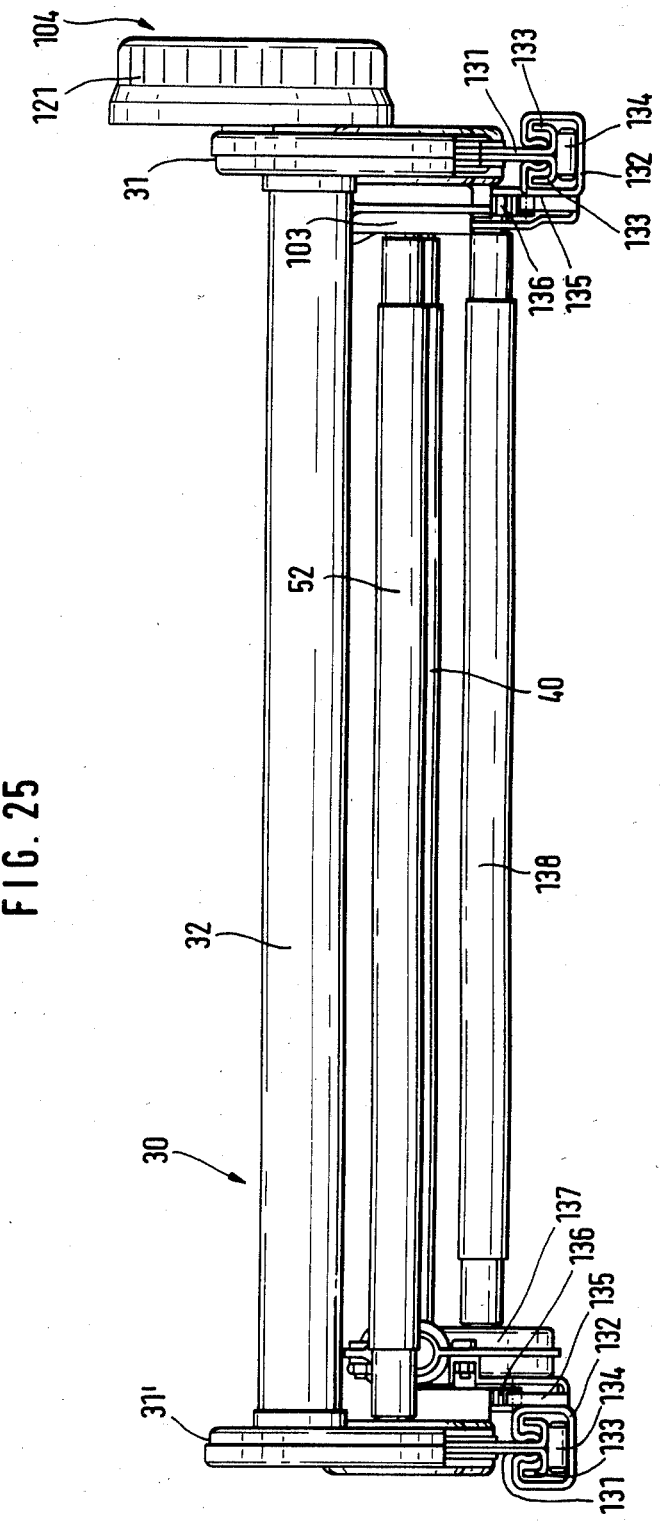
FIG. 25 is a front view of the seat support of FIGS. 23 and 24, supported on a rail arrangement.

In the above described embodiments, the rails 35, as mentioned above, are formed of angular pieces assembled into a T-shaped rail. These rails can in some cases be arranged on a guide rail structure or, when no longitudinal displacement of the seat is desired, directly on the vehicle bottom. In the embodiment shown in FIGS. 23-25, the rails 131 which hold the seat support 30 are fixed in a guide rail 132 attached to the vehicle body in a longitudinally displaceable manner. The foot of the rails 131 is formed, not only on the grounds of stability, from two C-shaped legs 133 lying on one another. The legs 133 engage in box-shaped guide rails 132 and are supported there for example on inwardly arranged rollers 132. Toothed racks 135 are fixed on the inner side of the guide rails 132, as can be seen for example in FIG. 25, at both longitudinal sides of the seat and extend in the longitudinal direction of the guide rails. A pinion 136 supported on the rails 131 at both sides engages in the toothed racks 135, as can be seen in FIG. 25.

A worm drive 137 is mounted on the longitudinal side of the seat support 30 having the lateral support member 31 coaxial with the pinion 136. The worm gear of this worm drive 137 is coupled with a transmission shaft 138 through which the rotary movement of the worm gear can be transferred to the side of the seat support having the lateral support member 31 for the purpose of synchronous running. The drive means for the worm drive 137 for the longitudinal adjustment of the seat support 30 is provided manually via a not shown handwheel which can be connected via a not shown flexible shaft with the worm drive 137. It is also possible to drive the worm drive 137 with the aid of a motor.

Figure 26:
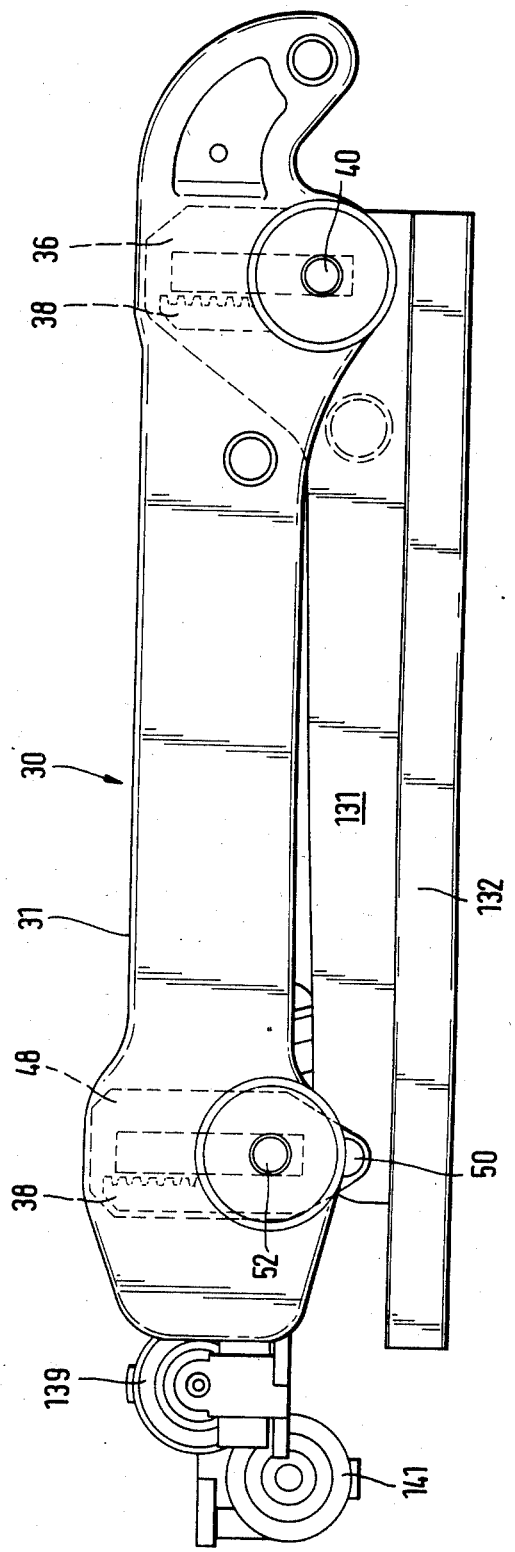
FIG. 26 is a side view of a further embodiment of a seat support which has an individual motor drive and is supported on a guide rail arrangement.
Figure 27:
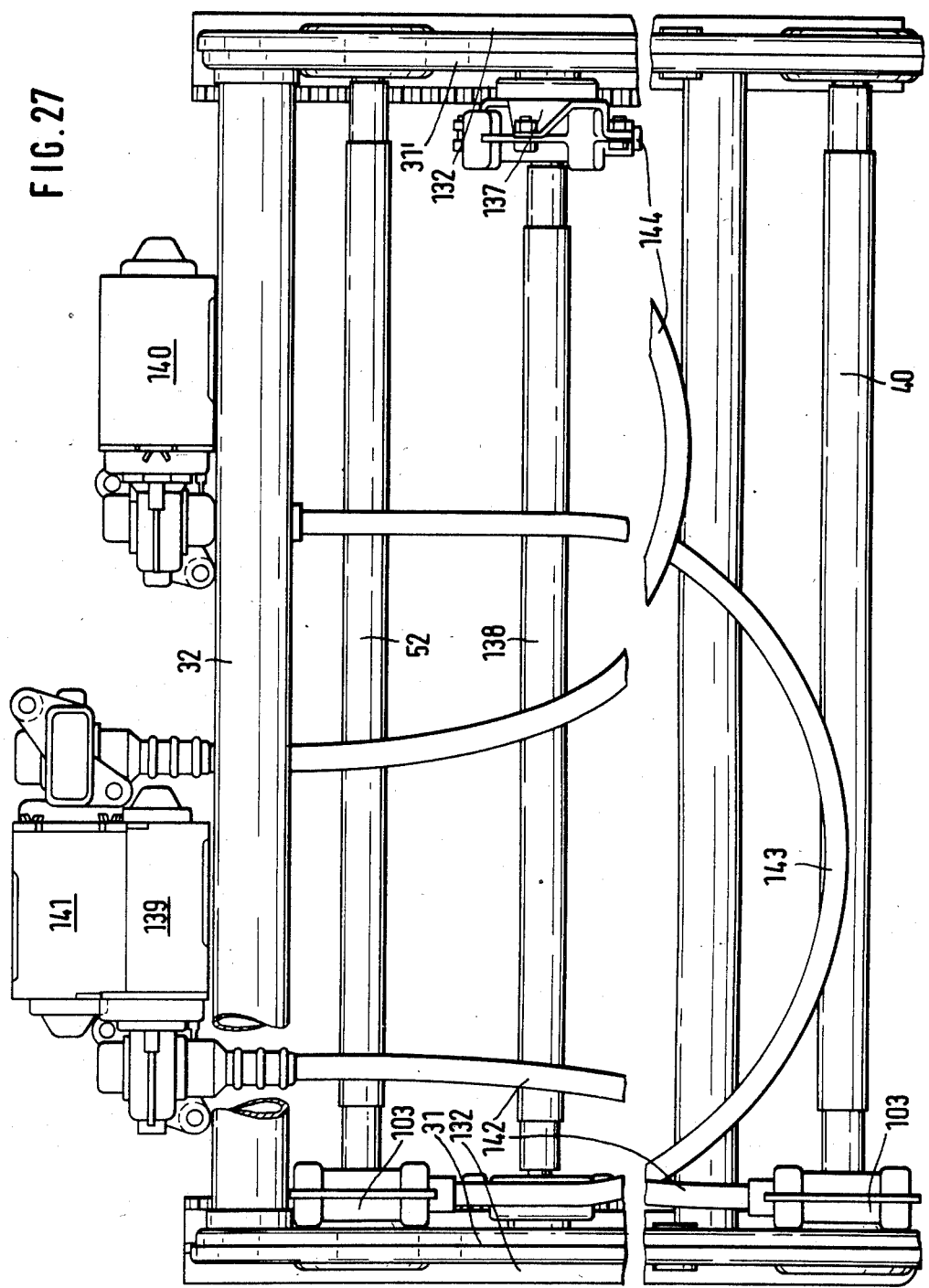
FIG. 27 is a plan view of the seat support shown in FIG. 26 and provided with the individual drives.

Instead of a manually activated adjusting device for the height adjustment of the seat support 30, it is also possible to provide a motor-operated height adjustment. The embodiment shown in FIGS. 26 and 27 has a seat support adjustable by adjusting motors 139, 140 and 141. The adjusting motors are held in the front region of the seat support on consoles which can for example be fixedly connected with the transverse support member 32. As can be clearly seen from FIG. 27, each worm drive is associated with a separate adjusting motor. For example, the adjusting motor 139 is connected in torque-transmitting manner with the worm drive 103 associated with the adjusting shaft 40 in the rear seat region. The adjusting motor 140 is connected via a flexible shaft 143 with the worm drive 103 associated with the adjusting shaft 52 in the front seat region. Finally, the adjusting motor 141 drives via a flexible shaft 144 the worm drive 137 for longitudinal adjustment of the seat support 30 arranged on the rail 131 relative to the guide rail 132. The respective control of the adjusting motors 139-141 can provide for independent lifting or lowering of the front and rear seat regions, or when needed can provide simultaneous lifting or lowering. Moreover, it is also possible, independently from or in connection with the height adjustment, to provide a longitudinal adjustment by the respective control of the adjusting motor.

Figure 28:
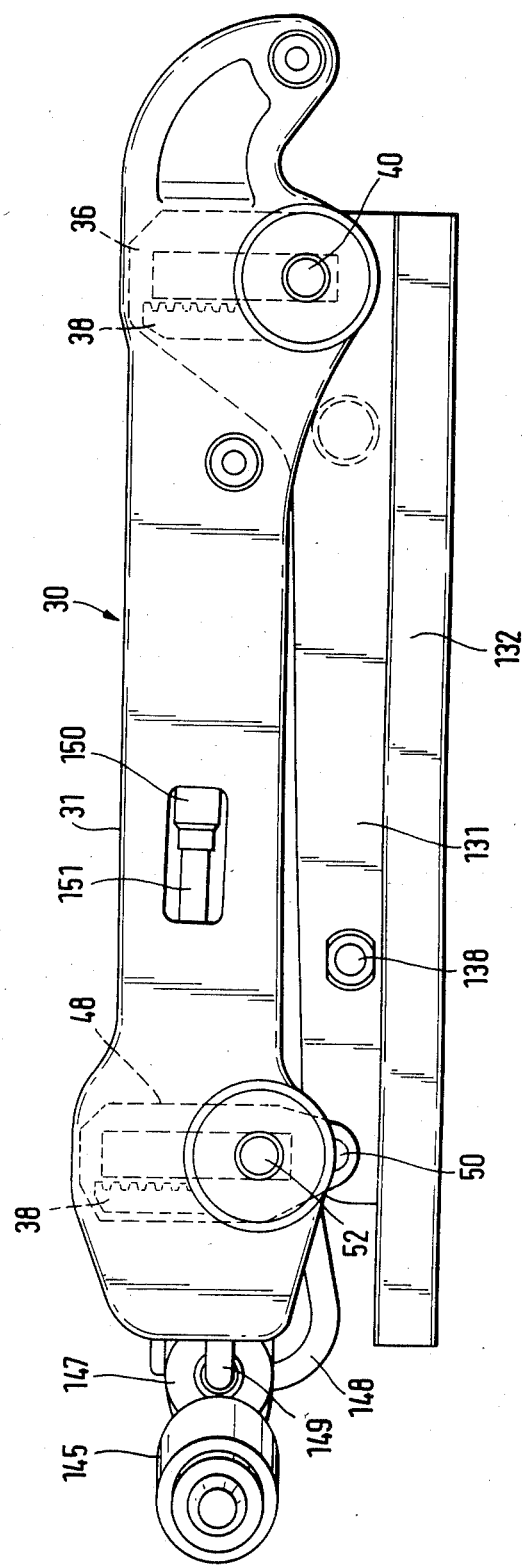
FIG. 28 is a side view of a seat support which has a central drive motor and is supported on a guide rail arrangement.
Figure 29:
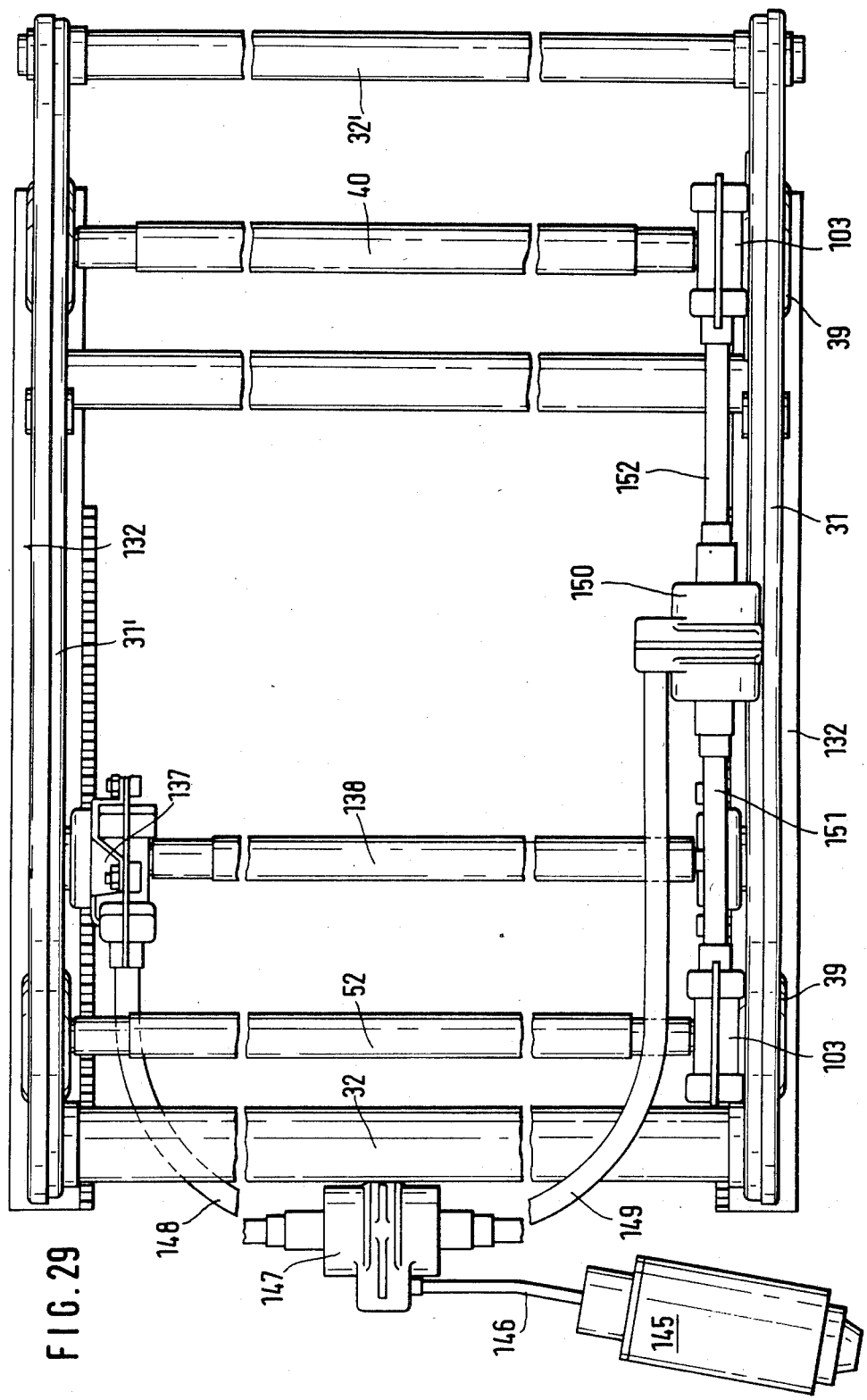
FIG. 29 is a plan view of the seat support shown in FIG. 28 and provided with the central drive motor.

Finally, in the embodiment shown in FIGS. 28–29, only one central drive motor 145 can be provided for all adjusting movements. This drive motor 145 arranged at any location is connected with a distributing transmission 147, for example via flexible shaft 146, wherein the distributing transmission can be fixed for example on the transverse support member 32. The distributing transmission 147 has one driving input and two driven outputs. One of the driven outputs can be connected via a flexible shaft 148 with the worm drive 137 for the longitudinal adjustment of the seat, whereas the other driven output of the distributing transmission 147 is connected via flexible shaft 149 with the input side of a further distributing transmission 150 fixed on the lateral support member 31. Both driven sides of the distributing transmission 150 are connected via further flexible shafts 151 and 152 with the worm drive 103 for height adjustment of the seat. It is to be understood that the worm drive 103, fixed for example on the lateral support member 31, again engages by its worm gears the shaft 40 or 52 which receives at both ends the pinion 141 shown in FIGS. 3-9 for joint rotation therewith, and the pinion 41 in turn is in engagement with the toothed rack 38 fixed on the swinging member 48 or with the toothed rack 38 fixed on the support web 36 of the rail 131. The pinion 41 arranged at both sides of the seat support 30 in each hollow space of the lateral support members 31 and 31' are arranged on the ends of the shafts 40 or 52 and thereby connected in pairs with one another in torque-transmitting manner. This is also true for the embodiment of FIGS. 28 and 29, in which the not shown pinions 136 are connected by the shaft 138 with one another in torque-transmitting manner for guaranteeing the synchronous running during the longitudinal adjustment of the seat support. For providing the height adjustment of the front seat region independently of the height adjustment of the rear seat region and the height adjustment itself independently of the longitudinal adjustment of the seat support, the advantageously switchable distributing transmissions 147 and 150 can be used whose one or another output point can be coupled singly or also both outlet points can be coupled with the inlet side.

It will be understood that each of the elements described above, or two or more together, may also find a useful application in other types of constructions differing from the types described above.

While the invention has been illustrated and described as embodied in an arrangement for height adjustment of seats, particularly power vehicle seats, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for height adjustment of a seat in a vertical direction, particularly a power vehicle seat having a seat support which includes two lateral support members and is connected with two rails associated with a vehicle bottom, the arrangement comprising
   means for adjusting a front end region of the seat and including a swinging member provided with a toothed rack and connecting a front end region of each of the lateral supporting members with the respective rail, a shaft extending only through and supported in the lateral supporting members and carrying two pinions each located in the respective lateral supporting member and engaging with the respective toothed rack, and a locking device arranged to fix in stepped manner said pinions together with the seat support in selectable height positions;
   means for adjusting a rear end region of the seat and including two further toothed racks extending in a substantially vertical direction and fixed on the respective rails, a further shaft extending only through and supported in the lateral supporting members of the seat support and supporting a rear end region of each lateral support member, two further pinions each associate with the respective lateral support member and connected for joint rotation with said further shaft, said further pinions being engageable with said further toothed racks, and a further locking device arranged to fix in stepped manner said further pinions in selectable height positions of the seat support; and means associated with said lateral supporting members and allowing vertical movement of said shaft with said pinions in engagement with said toothed racks, relative to said rails.

2. An arrangement for height adjustment of a seat, particularly a power vehicle seat having a seat support which includes two lateral support members each having a plurality of recesses and connected with two rails associated with a vehicle bottom, the arrangement comprising means for adjusting a front end region of the seat and including a swinging member provided with a toothed rack and connecting a front end region of each of the lateral supporting members with the respective rails, a shaft extending through the lateral supporting members and carrying two pinions each located in the respective lateral supporting member and engaging with the respective toothed rack, and a locking device arranged to fix in stepped manner said pinions together with the seat support in selectable height positions; means for adjusting a rear end region of the seat and including two further toothed racks extending in a substantially vertical direction and fixed on the respective rails, a further shaft extending through the seat support and supporting a rear end region of each lateral support member, two further pinions each associated with the respective lateral support member and connected for joint rotation with said further shaft, said further pinions being engageable with said further toothed racks, and a further locking device arranged to fix in stepped manner said further pinions in selectable height positions of the seat support, each of said locking devices including a claw disk which is arranged axially displaceable and non-rotatably on the respective shaft and in locking position engages with its claws into said recesses of the respective lateral support member; and adjusting elements each arranged to return the respective claw disk to its releasing position.

3. An arrangement as defined in claim 2, wherein each of said adjusting elements includes a lever mechanism which is fixed at an inner side of one of the lateral support members and arranged to self-return to an adjusting position and to engage with the respective claw disk.

4. An arrangement as defined in claim 2, wherein each of said adjusting elements includes an adjusting return spring, and an adjusting sleeve which is coupled with the respective claw disk, is axially displaceable on the respective shaft and has an adjusting cog actuatable against the force of said return spring.

5. An arrangement as defined in claim 2, wherein each of said adjusting elements includes a shaft end which is fixedly connected with the respective claw disk, supported axially displaceably on a longitudinal side of the respective lateral support member and self-returnable in locking direction.

6. An arrangement as defined in claim 1, wherein each of said adjusting elements includes a holding disk fixedly arranged at one side of each shaft and having a periphery with a plurality of blocking teeth, and a holding member arranged on the respective lateral support element and lockingly engageable in said holding disk.

7. An arrangement as defined in claim 6, wherein said holding member is formed as a pin which is provided with a cylinder head and arranged axially displaceable in the respective lateral support member and self-transferrable to its locking position, said holding disk having a plurality of segment-like recesses provided between said locking teeth so that said cylinder head of said pin engages into said recesses in the locking position.

8. An arrangement as defined in claim 6, wherein said holding member is formed as a locking lever which has a toothed segment and is supported on the respective lateral support member for self-returning to the locking position.

9. An arrangement as defined in claim 3; and further comprising a common adjusting lever which is pivotally supported on the respective lateral support member and selectively actuates the lever mechanism of said first-mentioned locking device in the front end region and the lever mechanism of said further locking device in the rear end region for transferring the respective claw disk to its releasing position.

10. An arrangement as defined in claim 9, wherein each of said locking devices has a lever, said adjusting lever having a pivot pin and two curved sectors provided on said pivot pin and inclined in its axial direction, each of said curved sectors being connected with an end of the respective lever.

11. An arrangement as defined in claim 1; and further comprising torsion helical springs which surround the shafts of said first-mentioned and said further locking devices and arranged to compensate the seat weight and the normal weight of a seat user, each of said springs having one end fixed with the respective shaft and another end fixed with the respective lateral support member.

12. An arrangement as defined in claim 1, wherein each of said locking devices includes a worm drive arranged on each of said shafts and having a worm gear which is connected for joint rotation with the shaft carrying the pinion engageable with the toothed rack, and a worm which forms a driving member for the pinion arranged at both ends of the shaft.

13. An arrangement as defined in claim 12, wherein each of said worm drives associated with the respective shaft is fixed at one side of the support on the same lateral support member; and further comprising a central adjusting screw arranged on the same lateral support member and connected with both worm drives so as to selectively actuate the worm drive.

14. An arrangement as defined in claim 13, wherein said central adjusting screw includes a bearing body fixed on the lateral support member and extending at the inner side of the latter with two bearing ears spaced from one another; and further comprising two bevel gears facing toward one another and arranged in said bearing ears, a horizontally movable bearing plate which is held on said bearing body and carries on the one hand a further bevel gear coaxial and rotatably connected with a screw pinion, and carries on the other hand a bearing projection for receiving a key pin for moving said bearing plate, said key pin being engaged by a handwheel which has an inner toothed rim engageable with said screw pinion and an outer side located before an adjusting grip connected for joint rotation with said key pin.

15. An arrangement as defined in claim 14, wherein said further bevel gear has a pinion shaft, said bearing plate together with said pinion shaft of said further bevel gear, said handwheel and said bearing projection which receives said key pin is held horizontally displaceable on said bearing body.

16. An arrangement as defined in claim 14, wherein said further bevel gear has a pinion shaft, said bearing plate holding said further bevel gear which has said pinion shaft as well as said key pin and said bearing projection which receives said handwheel, said bearing plate being formed as a swinging lever.

17. An arrangement as defined in claim 1, wherein the rails which hold the seat support are arranged longitudinally displaceable in a guide rail fixed to the vehicle bottom, a further toothed rack being arranged at least at one longitudinal side of the seat on an inner side of said guide rail, a further pinion engageable with said further toothed rack being arranged on the longitudinally displaceable rail, and a worm drive being arranged to actuate said further pinion.

18. An arrangement as defined in claim 17, wherein two such further toothed racks are arranged at both longitudinal sides of the seat support and two such further pinions are engageable which said two further toothed racks and connected with one another with a transmission shaft.

19. An arrangement as defined in claim 17; and further comprising adjusting motors arranged so that said worm drives for height adjustment and said worm drives for longitudinal adjustment are associated with the respective adjusting motors, each of said adjusting motors being connected with the respective worm drive by a flexible shaft.

20. An arrangement as defined in claim 17, wherein said worm drive for height adjustment and said worm drive for longitudinal adjustment are connected with a central drive motor in torque-transmitting manner.

21. An arrangement as defined in claim 20, wherein said central drive motor is connected with a first distributing transmission having an input and two outputs, one of said outputs being connected with the worm drive for longitudinal adjustment and the other output being connected with a further distributing transmission also having an input and two outputs, one output of said further distributing transmission being connected with the worm drive for front height adjustment and the other output of said further distributing transmission being connected with the worm drive for the rear height adjustment of the seat.

22. An arrangement as defined in claim 21, wherein said central drive motor is connected with the first-mentioned distributing transmission, said first-mentioned distributing transmission is connected with the worm drive for longitudinal adjustment, said worm drive for longitudinal adjustment is connected with said further distributing transmission, and said further distributing transmission is connected with the worm drive for height adjustment by flexible shafts.

23. An arrangement as defined in claim 1; and further comprising bearing consoles provided with swinging members, said lateral support members including lateral shells which surround the rails or bearing consoles at least sectionally in a sandwich-like manner.

* * * * *